(12) United States Patent
Joao

(10) Patent No.: US 11,760,227 B2
(45) Date of Patent: Sep. 19, 2023

(54) BATTERY POWER MANAGEMENT APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

(21) Appl. No.: 17/544,983

(22) Filed: Dec. 8, 2021

(65) Prior Publication Data
US 2022/0258647 A1    Aug. 18, 2022

Related U.S. Application Data

(60) Provisional application No. 63/149,530, filed on Feb. 15, 2021.

(51) Int. Cl.
| | |
|---|---|
| *B60R 22/00* | (2006.01) |
| *F02P 9/00* | (2006.01) |
| *B60R 16/033* | (2006.01) |
| *H02J 7/14* | (2006.01) |
| *B60L 58/18* | (2019.01) |
| *H01M 10/46* | (2006.01) |
| *B60K 7/00* | (2006.01) |
| *B60L 53/24* | (2019.01) |
| *H02J 7/00* | (2006.01) |

(52) U.S. Cl.
CPC ............ *B60L 58/18* (2019.02); *B60K 7/0007* (2013.01); *B60L 53/24* (2019.02); *H01M 10/46* (2013.01); *H02J 7/00032* (2020.01); *H02J 7/143* (2020.01); *H02J 7/1423* (2013.01); *B60L 2200/10* (2013.01); *B60L 2200/32* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2,674,352 | A | 4/1954 | Braun, Sr. |
| 3,482,037 | A | 12/1969 | Brown et al. |
| 4,206,449 | A | 6/1980 | Galvin et al. |
| 4,216,375 | A | 8/1980 | Ulch et al. |
| 4,333,093 | A | 6/1982 | Raber et al. |

(Continued)

OTHER PUBLICATIONS

U.S. Appl. No. 08/681,172, Polish.
U.S. Appl. No. 60/014,427, DiRienzo.

*Primary Examiner* — Kenneth B Wells
(74) *Attorney, Agent, or Firm* — Raymond A. Joao, Esq.

(57) ABSTRACT

An apparatus, including a first circuit which contains a first load which does not draw current from a first battery when not operating, and includes an electric motor of an electric vehicle or hybrid vehicle; a second circuit which contains a second load which draws current from a second battery when the first load is not operating or is non-operational; a first switch which is capable of disconnecting the first battery from the first circuit; a second switch which is capable of connecting the first battery to the first circuit; and at least one recharger which is capable of recharging the first battery and the second battery when the first load is operating. The apparatus is capable of providing electrical power to the second load when the at least one recharger ceases to operate or becomes non-operational. The first load is an eaxle.

21 Claims, 15 Drawing Sheets

(56) References Cited

U.S. PATENT DOCUMENTS

| | | |
|---|---|---|
| 4,347,590 A | 8/1982 | Heger et al. |
| 4,385,240 A | 5/1983 | Sato |
| 4,420,238 A | 12/1983 | Felix |
| 4,522,146 A | 6/1985 | Carlson |
| 4,644,478 A | 2/1987 | Stephens et al. |
| 4,772,875 A | 9/1988 | Maddox et al. |
| 4,785,472 A | 11/1988 | Shapiro |
| 4,789,904 A | 12/1988 | Peterson |
| 4,857,912 A | 8/1989 | Everett, Jr. et al. |
| 4,893,240 A | 1/1990 | Karkouti |
| 4,896,580 A | 1/1990 | Rudnicki |
| 4,991,123 A | 2/1991 | Casamassima |
| 5,006,840 A | 4/1991 | Hamada et al. |
| 5,056,136 A | 10/1991 | Smith |
| 5,083,106 A | 1/1992 | Kostusiak et al. |
| 5,168,170 A | 12/1992 | Hartig |
| 5,210,873 A | 5/1993 | Gay et al. |
| 5,223,816 A | 6/1993 | Levinson et al. |
| 5,295,551 A | 3/1994 | Sukonick |
| 5,321,396 A | 6/1994 | Lamming et al. |
| 5,400,018 A | 3/1995 | Scholl et al. |
| 5,436,960 A | 7/1995 | Campana, Jr. et al. |
| 5,442,553 A | 8/1995 | Parrillo |
| 5,445,347 A | 8/1995 | Ng |
| 5,513,244 A * | 4/1996 | Joao ................ B60R 25/33 340/425.5 |
| 5,515,285 A | 5/1996 | Garrett, Sr. et al. |
| 5,519,669 A | 5/1996 | Ross et al. |
| 5,523,950 A | 6/1996 | Peterson |
| 5,533,589 A | 7/1996 | Critzer |
| 5,625,670 A | 4/1997 | Campana, Jr. et al. |
| 5,786,746 A | 7/1998 | Lombardo et al. |
| 5,790,019 A | 8/1998 | Edwin |
| 5,819,172 A | 10/1998 | Campana, Jr. et al. |
| 5,838,250 A | 11/1998 | Maekawa |
| 5,850,250 A | 12/1998 | Konopka et al. |
| 5,861,799 A | 1/1999 | Szwed |
| 5,917,405 A | 6/1999 | Joao |
| 5,976,567 A | 11/1999 | Wheeler et al. |
| 5,978,648 A | 11/1999 | George et al. |
| 5,999,808 A | 12/1999 | Ladue |
| 6,001,065 A | 12/1999 | DeVito |
| 6,001,066 A | 12/1999 | Canfield et al. |
| 6,002,720 A | 12/1999 | Yurt et al. |
| 6,002,972 A | 12/1999 | Palmer |
| 6,003,007 A | 12/1999 | DiRienzo |
| 6,006,159 A | 12/1999 | Schmier et al. |
| 6,007,095 A | 12/1999 | Stanley |
| 6,007,426 A | 12/1999 | Kelly et al. |
| 6,009,355 A | 12/1999 | Obradovich et al. |
| 6,009,356 A | 12/1999 | Monroe |
| 6,009,363 A | 12/1999 | Beckert et al. |
| 6,009,370 A | 12/1999 | Minowa et al. |
| 6,014,447 A | 1/2000 | Kohnen et al. |
| 6,014,569 A | 1/2000 | Bottum |
| 6,016,475 A | 1/2000 | Miller et al. |
| 6,018,710 A | 1/2000 | Wynblatt et al. |
| 6,020,825 A | 2/2000 | Chansky et al. |
| 6,020,826 A | 2/2000 | Rein |
| 6,023,708 A | 2/2000 | Mendez et al. |
| 6,028,537 A | 2/2000 | Suman et al. |
| 6,044,990 A | 4/2000 | Palmeri |
| 6,046,678 A | 4/2000 | Wilk |
| 6,047,264 A | 4/2000 | Fisher et al. |
| 6,061,570 A | 5/2000 | Janow |
| 6,067,451 A | 5/2000 | Campana, Jr. et al. |
| 6,067,571 A | 5/2000 | Igarashi et al. |
| 6,073,106 A | 6/2000 | Rozen et al. |
| 6,075,527 A | 6/2000 | Ichihashi et al. |
| 6,076,066 A | 6/2000 | DiRienzo et al. |
| 6,078,800 A | 6/2000 | Kasser |
| 6,084,510 A | 7/2000 | Lemelson et al. |
| 6,091,956 A | 7/2000 | Hollenberg |
| 6,102,487 A | 8/2000 | .O slashed.vreb.o slashed. |
| 6,104,815 A | 8/2000 | Alcorn et al. |
| 6,108,493 A | 8/2000 | Miller et al. |
| 6,113,493 A | 9/2000 | Walker et al. |
| 6,131,060 A | 10/2000 | Obradovich et al. |
| 6,131,096 A | 10/2000 | Ng et al. |
| 6,131,116 A | 10/2000 | Riggins et al. |
| 6,137,485 A | 10/2000 | Kawai et al. |
| 6,138,241 A | 10/2000 | Eckel et al. |
| 6,141,608 A | 10/2000 | Rother |
| 6,141,620 A | 10/2000 | Zybert et al. |
| 6,144,702 A | 11/2000 | Yurt et al. |
| 6,148,081 A | 11/2000 | Szymanski et al. |
| 6,148,291 A | 11/2000 | Radican |
| 6,151,606 A | 11/2000 | Mendez |
| 6,151,626 A | 11/2000 | Tims et al. |
| 6,161,005 A | 12/2000 | Pinzon |
| 6,167,432 A | 12/2000 | Jiang |
| 6,181,994 B1 | 1/2001 | Colson et al. |
| 6,191,825 B1 | 2/2001 | Sprogis et al. |
| 6,208,379 B1 | 3/2001 | Oya et al. |
| 6,208,386 B1 | 3/2001 | Wilf et al. |
| 6,208,973 B1 | 3/2001 | Boyer et al. |
| 6,216,104 B1 | 4/2001 | Moshfeghi et al. |
| 6,226,389 B1 | 5/2001 | Lemelson et al. |
| 6,233,341 B1 | 5/2001 | Riggins |
| 6,233,506 B1 | 5/2001 | Obradovich et al. |
| 6,236,330 B1 | 5/2001 | Cohen |
| 6,243,691 B1 | 6/2001 | Fisher et al. |
| 6,244,758 B1 | 6/2001 | Solymar et al. |
| 6,249,241 B1 | 6/2001 | Jordan et al. |
| 6,252,522 B1 | 6/2001 | Hampton et al. |
| 6,263,322 B1 | 7/2001 | Kirkevold et al. |
| 6,269,392 B1 | 7/2001 | Cotichini et al. |
| 6,273,856 B1 | 8/2001 | Sun et al. |
| 6,275,231 B1 | 8/2001 | Obradovich |
| 6,278,396 B1 | 8/2001 | Tran |
| 6,281,797 B1 | 8/2001 | Forster et al. |
| 6,283,761 B1 | 9/2001 | Joao |
| 6,292,227 B1 | 9/2001 | Wilf et al. |
| 6,292,828 B1 | 9/2001 | Williams |
| 6,295,492 B1 | 9/2001 | Lang et al. |
| 6,297,853 B1 | 10/2001 | Sharir et al. |
| 6,307,948 B1 | 10/2001 | Kawasaki et al. |
| 6,313,546 B1 | 11/2001 | Nishimura et al. |
| 6,317,592 B1 | 11/2001 | Campana, Jr. et al. |
| 6,318,536 B1 | 11/2001 | Korman et al. |
| 6,321,221 B1 | 11/2001 | Bieganski |
| 6,330,482 B1 | 12/2001 | McCain et al. |
| 6,330,499 B1 | 12/2001 | Chou et al. |
| 6,331,825 B1 | 12/2001 | Ladner et al. |
| 6,332,098 B2 | 12/2001 | Ross et al. |
| 6,334,127 B1 | 12/2001 | Bieganski et al. |
| 6,341,265 B1 | 1/2002 | Provost et al. |
| 6,341,668 B1 | 1/2002 | Fayette et al. |
| 6,347,333 B2 | 2/2002 | Eisendrath et al. |
| 6,356,822 B1 | 3/2002 | Diaz et al. |
| 6,362,730 B2 | 3/2002 | Razavi et al. |
| 6,366,240 B1 | 4/2002 | Timothy et al. |
| 6,374,228 B1 | 4/2002 | Litwin |
| 6,381,583 B1 | 4/2002 | Kenney |
| 6,385,732 B1 | 5/2002 | Eckel et al. |
| 6,388,399 B1 | 5/2002 | Eckel et al. |
| 6,389,337 B1 | 5/2002 | Kolls |
| 6,400,996 B1 | 6/2002 | Hoffberg et al. |
| 6,408,278 B1 | 6/2002 | Carney et al. |
| 6,412,012 B1 | 6/2002 | Bieganski et al. |
| 6,424,998 B2 | 7/2002 | Hunter |
| 6,427,063 B1 | 7/2002 | Cook et al. |
| 6,429,810 B1 | 8/2002 | De Roche |
| 6,430,531 B1 | 8/2002 | Polish |
| 6,430,603 B2 | 8/2002 | Hunter |
| 6,430,605 B2 | 8/2002 | Hunter |
| 6,431,985 B1 | 8/2002 | Kim |
| 6,437,692 B1 | 8/2002 | Petite et al. |
| 6,464,142 B1 | 10/2002 | Denenberg et al. |
| 6,474,927 B1 | 11/2002 | McAdams et al. |
| 6,493,685 B1 | 12/2002 | Ensel et al. |
| 6,525,780 B1 | 2/2003 | Bruno et al. |
| 6,542,076 B1 | 4/2003 | Joao |
| 6,542,077 B2 | 4/2003 | Joao |

(56) References Cited

U.S. PATENT DOCUMENTS

| | | |
|---|---|---|
| 6,549,130 B1 | 4/2003 | Joao |
| 6,567,813 B1 | 5/2003 | Zhu et al. |
| 6,587,046 B2 | 7/2003 | Joac |
| 6,601,087 B1 | 7/2003 | Zhu et al. |
| 6,608,559 B1 | 8/2003 | Lemelson et al. |
| 6,610,954 B2 | 8/2003 | Takizawa |
| 6,615,186 B1 | 9/2003 | Kolls |
| 6,621,827 B1 | 9/2003 | Rezvani et al. |
| 6,646,655 B1 | 11/2003 | Brandt et al. |
| 6,654,032 B1 | 11/2003 | Zhu et al. |
| 6,686,838 B1 | 2/2004 | Rezvani et al. |
| 6,691,154 B1 | 2/2004 | Zhu et al. |
| 6,707,484 B1 | 3/2004 | Kawasaki et al. |
| 6,708,221 B1 | 3/2004 | Mendez et al. |
| 6,725,460 B1 | 4/2004 | Nishiyama et al. |
| 6,726,094 B1 | 4/2004 | Rantze et al. |
| 6,745,027 B2 | 6/2004 | Twitchell, Jr. |
| 6,763,501 B1 | 7/2004 | Zhu et al. |
| 6,766,454 B1 | 7/2004 | Riggins |
| 6,789,119 B1 | 9/2004 | Zhu et al. |
| RE38,609 E | 10/2004 | Chen et al. |
| 6,804,656 B1 | 10/2004 | Rosenfeld et al. |
| 6,810,488 B2 | 10/2004 | Teng |
| 6,816,616 B2 | 11/2004 | Teng |
| 6,816,817 B1 | 11/2004 | Retlich et al. |
| 6,850,965 B2 | 2/2005 | Allen |
| 6,882,269 B2 | 4/2005 | Moreno |
| 6,901,439 B1 | 5/2005 | Bonasia et al. |
| 6,901,448 B2 | 5/2005 | Zhu et al. |
| 6,924,727 B2 | 8/2005 | Nagaoka et al. |
| 6,925,645 B2 | 8/2005 | Zhu et al. |
| 6,927,686 B2 | 8/2005 | Nieters et al. |
| 6,930,455 B2 | 8/2005 | Chansky et al. |
| 6,943,681 B2 | 9/2005 | Rezvani et al. |
| 7,164,117 B2 | 1/2007 | Breed et al. |
| 7,253,731 B2 | 8/2007 | Joao |
| 7,277,010 B2 | 10/2007 | Joao |
| 7,397,363 B2 | 7/2008 | Joao |
| 7,482,920 B2 | 1/2009 | Joao |
| 8,237,305 B2 | 8/2012 | Kade et al. |
| 8,324,754 B2 | 12/2012 | Broesse et al. |
| 9,007,001 B2 | 4/2015 | Sugiyama et al. |
| 9,075,136 B1 | 7/2015 | Joao |
| 9,235,841 B2 | 1/2016 | Joao |
| 9,245,270 B2 | 1/2016 | Joao |
| 9,705,319 B2 | 7/2017 | Morita |
| 9,821,738 B2 | 11/2017 | Joao |
| 9,885,782 B2 | 2/2018 | Joac |
| 9,911,124 B2 | 3/2018 | Joao |
| 10,011,247 B2 | 7/2018 | Joao |
| 10,152,876 B2 | 12/2018 | Joao |
| 10,157,385 B2 | 12/2018 | Joao |
| 10,207,663 B2 | 2/2019 | Joao |
| 10,493,931 B2 | 12/2019 | Joao |
| 10,546,441 B2 | 1/2020 | Joao |
| 10,562,492 B2 | 2/2020 | Joao |
| 10,913,412 B2 | 2/2021 | Joao |
| 11,270,538 B2 | 3/2022 | Joao |
| 11,312,322 B2 | 4/2022 | Joao |
| 2001/0032099 A1 | 10/2001 | Joao |
| 2002/0016655 A1 | 2/2002 | Joao |
| 2002/0017996 A1 | 2/2002 | Niemiec |
| 2002/0032583 A1 | 3/2002 | Joao |
| 2002/0046299 A1 | 4/2002 | Lefeber et al. |
| 2002/0049622 A1 | 4/2002 | Lettich et al. |
| 2002/0049822 A1 | 4/2002 | Burkhardt et al. |
| 2002/0072808 A1 | 6/2002 | Li |
| 2002/0077077 A1 | 6/2002 | Rezvani et al. |
| 2002/0099567 A1 | 7/2002 | Joao |
| 2002/0108125 A1 | 8/2002 | Joao |
| 2002/0116318 A1 | 8/2002 | Thomas et al. |
| 2002/0121969 A1 | 9/2002 | Joao |
| 2002/0198774 A1 | 12/2002 | Weirich |
| 2003/0009361 A1 | 1/2003 | Hancock et al. |
| 2003/0014295 A1 | 1/2003 | Brookes et al. |
| 2003/0016130 A1 | 1/2003 | Joao |
| 2003/0062998 A1 | 4/2003 | Rubenstein |
| 2003/0067541 A1 | 4/2003 | Joao |
| 2003/0071899 A1 | 4/2003 | Joao |
| 2003/0084125 A1 | 5/2003 | Nagda et al. |
| 2003/0110215 A1 | 6/2003 | Joao |
| 2003/0140107 A1 | 7/2003 | Rezvani et al. |
| 2003/0193404 A1 | 10/2003 | Joao |
| 2003/0206102 A1 | 11/2003 | Joao |
| 2003/0224854 A1 | 12/2003 | Joao |
| 2004/0098515 A1 | 5/2004 | Rezvani et al. |
| 2004/0160319 A1 | 8/2004 | Joao |
| 2004/0230601 A1 | 11/2004 | Joao et al. |
| 2005/0040937 A1 | 2/2005 | Cuddihy et al. |
| 2005/0088320 A1 | 4/2005 | Kovach |
| 2005/0248444 A1 | 11/2005 | Joao |
| 2006/0206259 A1 | 9/2006 | Stiller et al. |
| 2008/0234878 A1 | 9/2008 | Joao |
| 2009/0146805 A1 | 6/2009 | Joao |
| 2009/0251530 A1 | 10/2009 | Cilia |
| 2012/0133770 A1 | 5/2012 | Joao |
| 2013/0041524 A1 | 2/2013 | Brey |
| 2014/0078275 A1 | 3/2014 | Joao et al. |
| 2014/0085445 A1 | 3/2014 | Joao et al. |
| 2014/0241585 A1 | 8/2014 | Zafiroglu et al. |
| 2014/0354402 A1 | 12/2014 | Joao |
| 2015/0160653 A1 | 6/2015 | Cheatham, III et al. |
| 2015/0298654 A1 | 10/2015 | Joao et al. |
| 2016/0288746 A1* | 10/2016 | Namuduri ........... F02N 11/0866 |
| 2016/0358017 A1 | 12/2016 | Guzik |
| 2018/0189766 A1 | 7/2018 | Batten et al. |
| 2019/0180603 A1 | 6/2019 | Kinney et al. |
| 2019/0206221 A1 | 7/2019 | Buck, Jr. et al. |
| 2022/0258647 A1 | 8/2022 | Joao |

\* cited by examiner

BATTERY POWER MANAGEMENT APPARATUS AND METHOD

RELATED APPLICATIONS

This application claims the benefit of the priority of U.S. Provisional Patent Application Ser. No. 63/149,530, filed Feb. 15, 2021, and entitled "BATTERY POWER MANAGEMENT APPARATUS AND METHOD", the subject matter and teachings of which are hereby incorporated by reference herein in their entirety.

FIELD OF THE INVENTION

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise need to be provided with power when a power source and/or a battery recharging source ceases to operate or is not operational, and/or the present invention pertains to a battery power management apparatus and method which can be utilized to generate electric power so as to recharge a battery or batteries of an electric vehicle or a hybrid vehicle, of any type or kind, while the electric vehicle or the hybrid is in use or operating, as well as which can be utilized to conserve battery power and/or battery charge level for an electric vehicle or a hybrid vehicle, of any type or kind, as well as for any electrical systems and/or components of the same, which do not require power when the electric vehicle or the hybrid vehicle is not operating or not in use, while providing power to and/or for electrical systems and/or components which require power when the electric vehicle or the hybrid vehicle is not operating or not in use, or which otherwise need to be provided with power when a power source and/or a battery recharging source ceases to operate or is not operational.

BACKGROUND OF THE INVENTION

Batteries and direct current (DC) power sources are utilized in many applications. Perhaps one of the most common uses of batteries and DC power sources is in automobiles. Typically, a vehicle battery provides the power which powers the vehicle's ignition system and a vehicle alternator generates electrical power when the vehicle's engine is operating which power can be utilized to provide the electrical power for many of a wide variety of vehicle systems, equipment systems, and/or components, along with electrical power to charge the vehicle battery.

As many who own a vehicle will readily understand, there are a number of vehicle systems, equipment systems, or components, such as, but not limited to, anti-theft systems, RF systems which operate in connection with remote control door lock openers, electronic command computers, radio clocks, and any other systems, equipment systems, or components, which require power when the vehicle is not operating, not in use, or when the engine is not operating or is not running. These vehicle systems, equipment systems, or components, which require power when the vehicle is not operating, not in use, or when the engine is not operating or is not running, presents which some may call drain or a "parasitic drain" on the vehicle battery. This drain or "parasitic drain" on the vehicle battery can deplete the vehicle's battery of its charge to a point where the battery either goes dead or does not have sufficient power to start the vehicle and/or to ensure that all vehicle systems, equipment systems, or components, are fully powered.

Disconnecting a vehicle's battery when the vehicle is not in use can serve to reserve the battery charge and/or power level, but such disconnecting of the battery deprives those vehicle systems, equipment systems, or components, which require power when the vehicle is not operating, not in use, or when the engine is not operating or is not running, of power and thereby shutting the same down. The shutting down of a vehicle's command computer, anti-theft system, radio clock, or dashboard gauges, or any other systems, equipment systems, or components, is not desirable. While vehicles are designed and built to accommodate these drains and/or "parasitic drains" on the vehicle battery when the vehicle is not operating, not in use, or when the engine is not operating or is not running, sometimes these drains or "parasitic drains" can cause a battery to lose its charge or "go dead". Sometimes these drains are also caused by short circuits in a vehicle electric circuit, and the diagnosing and repair of same can be very time consuming and expensive.

Similar drains or "parasitic drains" can also be found in DC circuits utilized in any type or kind of vehicles, land vehicles, automobiles, trucks, recreational vehicles, boats, marine vessels, submarines, aircraft, airplanes, jets, helicopters, spacecraft, space shuttles, recreational vehicles, motorcycles, scooters, or any other type or kind of vehicle, any type or kind of premises, residential premises, commercial premises, equipment, of any system, equipment system, or component, of, in, or associated with, same, or any article which may utilize a DC power source.

Other problems can also arise when a vehicle power source or battery recharging device or source ceases to operate or is not operational, or is turned off, suddenly, unintentionally, or otherwise. For example, certain vehicles utilize alternators in order to provide power to certain of the vehicle's systems, equipment systems, devices, or components, and in order to recharge the vehicle battery, when the vehicle engine is running. The alternator might provide power to any number of vehicle systems, equipment systems, devices, or components, as well as recharge the vehicle battery when the engine is running, but the alternator stops doing so when the vehicle engine stops running or is turned off. When this occurs, those vehicle systems, equipment systems, devices, or components, which are powered by the alternator, lose power and become non-operational. These vehicle systems, equipment systems, devices, or components, can include the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, the vehicle's emergency communication systems, among others. Any loss of power to these vehicle systems, equipment systems, devices, or components can result in accidents which can cause serious injury or even death.

Similar loss of power problems can also be found in AC and/or DC circuits utilized in any type or kind of vehicles, land vehicles, automobiles, trucks, recreational vehicles, boats, marine vessels, submarines, aircraft, airplanes, jets, helicopters, spacecraft, space shuttles, recreational vehicles, motorcycles, scooters, or any other type or kind of vehicle, any type or kind of premises, residential premises, commercial premises, equipment, of any system, equipment system, or component, of, in, or associated with, same, or any article which may utilize a DC power source or battery in connection with a power source such as a generator or alternator which can provide power to certain systems, equipment systems, devices, or components, and/or which may also serve to recharge the DC power source or battery.

SUMMARY OF THE INVENTION

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise needs to be provided with power when a power source and/or a recharging source ceases to operate, is non-operational, or is turned off, and/or the present invention pertains to a battery power management apparatus and method which can be utilized to generate electric power so as to recharge a battery or batteries of an electric vehicle or a hybrid vehicle, of any type or kind, while the electric vehicle or the hybrid is in use or operating, as well as which can be utilized to conserve battery power and/or battery charge level for an electric vehicle or a hybrid vehicle, of any type or kind, as well as for any electrical systems and/or components of the same, which do not require power when the electric vehicle or the hybrid vehicle is not operating or not in use, while providing power to and/or for electrical systems and/or components which require power when the electric vehicle or the hybrid vehicle is not operating or not in use, or which otherwise need to be provided with power when a power source and/or a battery recharging source ceases to operate or is not operational, which overcomes the shortfalls of the prior art.

The apparatus and method of the present invention can be utilized in any number of a wide variety of applications, including but not limited to, applications in, or in connection with, motor vehicles, automobiles, trucks, mass transportation vehicles, buses, school buses, trains, subway trains, aircraft, airplanes, jets, gliders, hot air balloons, spacecraft, space shuttles, satellites, boats, marine vehicles, marine vessels, submarines, motorcycles, motor scooters, recreational vehicles (RVs) of any type or kind, mobile homes, jet skis, equipment of any kind or type, or any other vehicle (hereinafter referred to as a "vehicle" or "vehicles"), or in applications in, or in connection with, premises, residential premises, commercial premises, buildings, structures, land, or any land and/or structure of any type or kind (hereinafter referred to as a "premises" or "premises"), or in applications in, with, or in connection with, any article or device (hereinafter "article" or "articles") which utilizes a battery or a DC power source and which is also equipped for, adapted for, or capable of, recharging that battery or DC power source. The apparatus and method of the present invention can be utilized in connection with gasoline-powered vehicles, diesel-powered vehicles, or any other fuel-powered vehicles, combustion engine powered vehicles, electric-powered vehicles, hybrid-powered vehicles, or any other types or kinds of vehicles.

The apparatus of the present invention can be utilized in, on, or in connection with, or can be adapted for and utilized in, on, or in connection with, any of the herein-identified and/or herein-defined vehicles, premises, or articles.

The apparatus includes a primary vehicle battery which can be connected to or with, or which is connectable to and/or with, the vehicle ignition system as well as any other vehicle electrical system or device or vehicle electronic system or device of the vehicle and which does not draw electrical power or current when the vehicle or the vehicle ignition system is not in use (hereafter collectively referred to as "non-drain loads"). The primary vehicle battery can be any battery or DC power source which is suitable for use in, on, or in connection with, the particular vehicle.

The primary vehicle battery can be electrically connected with, or coupled to, the vehicle ignition system in any appropriate circuit configuration, such as, but not limited to, a parallel connection or a series connection, or any combination of same, and to any number of any of the other non-drain loads in, on, or of, the vehicle in any appropriate circuit configuration, such as, but not limited to, a parallel connection or a series connection. The vehicle non-drain loads can be any electrical circuit, system, equipment system, device, or component, which requires electrical power when the vehicle, or any electrical circuit, system, equipment system, device, or component, is in use or is being operated.

The apparatus also includes a main cutoff switch which can be connected in series with the primary vehicle battery. The main cutoff switch can serve to disconnect the primary vehicle battery from all vehicle circuits and/or devices including, but not limited to, the vehicle ignition system and the vehicle non-drain loads. In this regard, the cutoff switch can be utilized to completely and electrically disconnect the primary vehicle battery from any and all loads in, on, or connected with, the vehicle.

The main cutoff switch can be a manual switch which can be placed at any suitable or convenient location in or on the vehicle and/or the main cutoff switch can also be a remotely controlled switch, such as those typically utilized in connection with remote controlled vehicle starters or remote controlled vehicle ignition systems. In this regard, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by a receiver or any other appropriate controller, control device, computer, or other device, which can cause the main cutoff switch to close in order to remotely enable the vehicle to be utilized, or can cause the main cutoff switch to open so as to disable vehicle operation.

The apparatus can also include a vehicle ignition/On switch, which can be connected in series with the primary vehicle battery and which can be utilized to electrically connect or electrically disconnect the primary vehicle battery to or from each of to the vehicle ignition system and/or to or from each of any number of the non-drain loads. The vehicle ignition/On switch can also be utilized to selectively activate the vehicle ignition system in order to start the vehicle engine and/or to activate, and/or to enable an activation of, any one or more of any of the vehicles systems, equipment systems, devices, or components, and/or any vehicle non-drain loads, of the vehicle and/or to activate, and/or to enable the activation of, any one or more of the electrical circuits, systems, equipment systems, devices, or components, and/or any vehicle non-drain loads, of the vehicle which require electrical power for use or operation.

The vehicle ignition/On switch can be a manual switch, such as those which are typically utilized in connection with a vehicle key and/or the vehicle ignition/On switch can also be a remotely controlled switch, such as those typically utilized in connection with remote controlled vehicle starters or remote controlled vehicle ignition systems. In this regard, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by the receiver or any other appropriate controller, control device, computer, or other device, which can cause the vehicle ignition/On switch to close in order to remotely start the vehicle's engine or can, in and under appropriate and safe circumstances, such when the vehicle engine is off, cause the vehicle ignition/On switch to open so as to disable vehicle operation.

The apparatus also includes a vehicle auxiliary battery which can be the same as, or can be of the same type or kind of battery or DC power source as the primary vehicle battery. Both of the primary vehicle battery and the vehicle auxiliary battery can be 12 volt automobile batteries, in the case where the vehicle is an automobile, which can have similar, if not identical, specifications and which can be recharged from, by, with, or using, the same electrical vehicle alternator described herein. The vehicle auxiliary battery can be connected in series or in parallel with each of all of the vehicle devices, equipment, equipment systems, or components, which typically drain current from a vehicle battery when the vehicle of the vehicle ignition systems is not operation or "off" (hereinafter collectively referred to as the "drain loads").

The drain loads can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times. In this regard, the drain loads can include, but are not limited to, a vehicle anti-theft system, a vehicle radio memory storage system or device, a radio clock, any command computer or command computers, remote door opening systems, or devices, remote control systems or devices, or any other systems, equipment systems, devices, or components, which are known to dram electrical power at all times and which can drain a vehicle battery of current and deplete its charge or charge level when a vehicle is typically not in use or is not operating.

The apparatus can also be connected to or with the vehicle alternator, which alternator is typically equipped to, and also used in order to, perform a number of functions including, but not limited to, recharging the battery of a vehicle, and which can be utilized in the apparatus of the present invention in order to continuously re-charge each of the primary vehicle battery and the vehicle auxiliary battery of the apparatus of the present invention. A single vehicle alternator can be used to recharge both the primary vehicle battery and the vehicle auxiliary battery. Two alternators can also be utilized so that one alternator can be utilized to charge the primary vehicle battery and so that the other alternator can be utilized to charge the vehicle auxiliary battery. Any pertinent circuits, components, or devices, of the alternator can be connected between each respective electrical circuit or connector(s) associated with the recharging of each of the primary vehicle battery and the vehicle auxiliary battery and a ground as needed or desired. In a preferred embodiment, the apparatus can also be connected to the ground as needed or desired.

In an embodiment in which two alternators are employed, one of the alternators can be dedicated for performing all of the functions of a typical vehicle alternator as well as, and including, recharging the primary vehicle battery and providing electrical power to the vehicle ignition system, the vehicle non-drain loads, or any electrical circuit, system, equipment system, device, or component, of the vehicle which requires electrical power when the vehicle, or any electrical circuit, system, equipment system, device, or component, is in use or is being operated, while the second alternator can be dedicated for recharging the vehicle auxiliary battery and, if needed or desired, for performing any other functions such as providing electrical power to any of the drain loads of the vehicle. In an embodiment in which two alternators are utilized, the first alternator can be connected to vehicle ground and to each of the various vehicle electrical circuits needed for providing any needed electrical power to the various electrical circuits, systems, equipment systems, devices, or components, of, in, on, or associated with, the vehicle and for recharging the primary vehicle battery, while the second alternator can be connected to vehicle ground and to any vehicle electrical circuit(s) needed for recharging the vehicle auxiliary battery as well as to any other electrical circuit(s) for which the second alternator is being utilized to supply electrical power.

The apparatus can also be utilized in order to remotely open or to remotely close each of the main cutoff switch and the vehicle ignition/On switch. In such an embodiment, the apparatus can include a transmitter, which can be any type or kind of remote control transmitter for opening or closing the circuit controlled by the main cutoff switch and which can be integrated into and/or with a vehicle remote control device, a key chain, or a key fob, or any other device, a receiver located at, in, or on, the vehicle, for receiving a signal, signals, or sequence of signals, transmitted from the transmitter and indicative of a main shutoff switch opening operation or a main cutoff switch closing operation, a controller for processing any signal, signals, or sequence of signals, received by the receiver, and an electronically activated switching device which can located in parallel with the main cutoff switch, which can serve to close or open the circuit controlled by the main cutoff switch. The electronically activated switching device can be placed in parallel with the main cutoff switch so that it can simply bypass the main cutoff switch.

The apparatus can also include a transmitter, which can be any type or kind of remote control transmitter for opening or closing the circuit controlled by the vehicle ignition/On switch and which can also be integrated into and/or with a vehicle remote control device, a key chain, or a key fob, or any other device, a receiver located at, in, or on, the vehicle, for receiving a signal, signals, or sequence of signals, transmitted from the transmitter and indicative of a vehicle ignition switch opening operation or a vehicle ignition switch closing operation, a controller for processing any signal, signals, or sequence of signals, received by the receiver, and an electronically activated switching device which can located in parallel with the vehicle ignition/On switch, which can serve to close or open the circuit controlled by the vehicle ignition/On switch. The electronically activated switching device can be placed in parallel with the vehicle ignition/On switch so that it can simply bypass the vehicle ignition/On switch.

The above-described transmitters can also be implemented by, replaced by, or used in conjunction with, a central processing computer or an Internet server which can be associated with a web site. Any authorized user or authorized person can utilize any suitable communication device, which can be a personal computer, a tablet, a tablet computer, a laptop computer, a notebook computer, a cellular telephone, a wireless telephone, a personal digital assistant, or any other suitable device, in order transmit any respective signal, signals, or sequence of signals, to a respective receiver via the central processing computer on, over, or via, the Internet and/or the World Wide Web, and/or on or over any other communication network(s), wireless communication network(s), or any combination of same. In this regard, any authorized user or authorized person can use or control the apparatus of the present invention on, over, or via, the Internet and/or the World Wide Web and/or any other communication network(s), wireless communication network(s), or any combination of same.

The apparatus of the present invention can be utilized to provide and to perform battery power management in and for any of the herein-described vehicles, premises, or articles, by providing, and/or by allowing for, the electrical powering of any electrical devices, which typically require electrical power at all times and/or when the respective vehicle, premises, or article, is not in use, while, at the same time, conserving the power of the main battery of the vehicle, the premises, or article, which is needed to activate and operate the vehicle, the premises, or the article, when same is desired to be used and/or in use.

In an embodiment wherein the main cutoff switch and the vehicle ignition switch are both in the "switch open" state or position or in the "OFF" state or position, which can be indicative of the vehicle not being in use, the primary vehicle battery can be completely disconnected from the vehicle ignition system and from the vehicle non-drain loads, which vehicle non-drain loads can be any electrical circuit, system, equipment system, device, or component, which requires electrical power when the vehicle, or any electrical circuit, system, equipment system, device, or component, is in use or is being operated. When the primary vehicle battery is completely disconnected from the vehicle ignition system and the vehicle non-drain loads, the electrical power and/or the charge level of the primary vehicle battery is conserved for later use. The apparatus provides the advantage that no electrical power is drained from the primary vehicle battery 10 when the vehicle is not operating and/or not in use, thereby conserving the charge level and the electrical power of the primary vehicle battery for later use.

The apparatus can also function as a valuable vehicle anti-theft device for the vehicle as no electrical power can be provided to the vehicle ignition system when the main cutoff switch is in the "switch open" or "OFF" sate or position. Even if one were to gain access to a vehicle key or otherwise attempt to bypass the vehicle ignition/On switch, the primary vehicle battery will remain disconnected from the vehicle ignition system and from the vehicle non-drain loads. In this manner, the apparatus of the present invention can also be utilized as a vehicle anti-theft system or device.

The vehicle auxiliary battery can provide electrical power to any and/or all of the drain loads which typically draw electrical power at all times and/or when the vehicle is in use, or operating, as well as when the vehicle is not in use or not operating. As noted above, the drain loads can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times.

In this regard, the apparatus of the present invention can provide electrical power to the drain loads from the vehicle auxiliary battery while conserving the charge level and electrical power capacity of the primary vehicle battery. As noted above, the apparatus can also serve an anti-theft function and/or a theft-deterrence function for the vehicle as the primary vehicle battery is, and remains, completely disconnected from the vehicle ignition system when the main cutoff switch is in the "switch open" state or position or in the "OFF" state or position.

When the main cutoff switch is in the "switch closed" position, the primary vehicle battery can be capable of providing electrical power to the vehicle ignition system and to any of the vehicle non-drain loads described herein, and/or to any of the vehicle's systems, equipment systems, components, or devices, which can be powered by the primary vehicle battery upon, and/or subject to, the closing of the vehicle ignition/On switch.

When both the main cutoff switch and the vehicle ignition/On switch are in the "switch closed" or "ON" position, an operator can start the vehicle's engine by closing the vehicle ignition/On switch. Once the vehicle engine is running, the primary vehicle battery can provide electrical power to or for the vehicle ignition system as well as to or for to any of the vehicle non-drain loads described herein, and/or to any of the vehicle's systems, equipment systems, components, or devices.

During vehicle engine operation, the alternator or alternators, if more than one alternator is utilized, and/or any respective component(s) of the alternator or alternators can be driven by the vehicle engine in order to generate electrical power which can include both an alternating current (AC) power and a direct current (DC) power. If a single alternator is utilized, then the alternator can re-charge both the primary vehicle battery and the vehicle auxiliary battery during vehicle engine operation and can provide electrical power to or for any of the vehicle non-drain loads or drain loads described herein, and/or to any of the vehicle's systems, equipment systems, components, or devices. If two alternators are utilized, then one alternator can be connected to, and can re-charge, the primary vehicle battery, as well as provide AC and/or DC power to any of the vehicle non-drain loads described herein, and/or to any of the vehicle's systems, equipment systems, components, or devices, while the other alternator can be connected to, and can re-charge, the vehicle auxiliary battery, as well as provide AC and/or DC power to any of the vehicle's drain loads. In this regard, both the primary vehicle battery and the vehicle auxiliary battery can be re-charged during vehicle engine operation.

Use of the apparatus of the present invention can be optimized if the main cutoff switch is opened, and, therefore, placed in the "switch open" state or position or in the "OFF" state or position, immediately after the vehicle engine is turned off and thereby returned to the "switch closed" state or position or the "ON" state or position just prior to attempting to start the vehicle engine or just prior to otherwise turning the vehicle, or any vehicle system, equipment system, component, or device, "ON", by closing the vehicle ignition/On switch, such as by switching the vehicle ignition/On switch to the "switch closed" state or position or to the "ON" state or position, or by otherwise simply turning and ignition key or pushing an ignition button or switch. In this regard, the primary vehicle battery can be "connected" when use of the vehicle, the vehicle engine, or any vehicle system, equipment system, component, or device powered by the primary vehicle battery, is desired, and the primary battery can be "disconnected" when use of the vehicle, the vehicle engine, or any vehicle system, equipment system, component, or device, which is powered by the primary vehicle battery, has ceased and/or is no longer desired. Substantial anti-theft advantages are also realized by the apparatus of the present invention as the vehicle engine will not be capable of being activated or started with the primary vehicle battery being disconnected from the vehicle ignition system.

The apparatus provides the vehicle auxiliary battery which can provide any and/or all of the vehicle drain loads with electrical power when the vehicle engine is off or not running, while preserving and/or conserving the battery charge level of the primary vehicle battery which can be completely disconnected from any electrical power or current drain loads, from the vehicle ignition system, and/or from any of the vehicle non-drain loads described herein, and/or from any of the vehicle's system, equipment systems, components, or devices. The apparatus provides a primary vehicle battery which can be completely disconnected from any load, from the vehicle ignition system, from any of the vehicle non-drain loads described herein, and/or to any of the vehicle's system, equipment systems, components, or devices, and/or from any of the vehicle drain loads, when the vehicle engine is not running, thereby maintaining a maximum charge level for the primary vehicle battery. Even if the charge level of the vehicle auxiliary battery should become depleted during a period of non-use of the vehicle engine, the primary vehicle battery can always have a sufficient charge level to start the vehicle engine and the respective vehicle alternator(s) can re-charge the vehicle auxiliary battery as well as can re-charge the primary vehicle battery.

In the manner described herein, the apparatus of the present invention provides a novel battery power management apparatus and method which can be utilized in order to provide an apparatus or system which can be utilized to ensure that a charge level of a primary vehicle battery can always be maintained, while allowing for sufficient electrical power to be provided to vehicle systems, equipment systems, components, or devices, which require and which continue to draw electrical power when the vehicle's engine is not running. In this regard, by using the apparatus of the present invention, one can ensure that any drain loads or short circuits will not cause a primary vehicle battery to be discharged or depleted of its charge and/or "go dead" while also ensuring that any and/or all vehicle systems, equipment systems, components, or devices, which require electrical power at all times and/or when the vehicle engine is not running, are provided with the electrical power needed to ensure their proper operation.

The can also include a voltage stabilizing load or resistor which can be utilized and which can be inserted between the circuit portion of the apparatus which is powered by the primary vehicle battery and the circuit portion of the apparatus which is powered by the vehicle auxiliary battery in order to connect the two circuit portions together. The resistor can be connected in between the positive sides of each of the primary vehicle battery and the vehicle auxiliary battery. With the use of the resistor, electrical power can be provided from the vehicle auxiliary battery to the vehicle ignition system and to the vehicle non-drain loads, if desired, when the vehicle ignition/On switch is in the "switch closed" state or position or in the "ON" state or position, whether or not the main cutoff switch is in the "switch closed" or "ON" state or position or in the "switch open" or "OFF" state or position. When the main cutoff switch is in the "switch closed" state or position or in the "ON" state or position, electrical power can also be provided from the primary vehicle battery to the vehicle drain loads, if desired. The resistor serves to connect the two circuit portions together while providing a stabilizing voltage drop across same in the event that the respective voltages of the primary vehicle battery and the vehicle auxiliary battery are not equal.

The apparatus and method of the present invention can also be utilized in order to provide power to any vehicle systems, equipment systems, devices, or components, in the event that the vehicle engine stops running, for any reason, which can result in the loss of the power being provided to any vehicle systems, vehicle equipment systems, devices, or components, which require power for the safe operation of the vehicle and/or for operator and/or occupant safety.

The vehicle auxiliary battery can be utilized to provide electrical power to vehicle drain/non-drain loads which can include any and/or all of the vehicle drain loads as well as any loads which can be, or which can include, any of the vehicle systems, equipment systems, devices, or components, such as, but not limited to, the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, and/or the vehicle's emergency communication systems, and/or any other load, or vehicle system, equipment system, device, or component.

Any of the vehicle drain/non-drain loads can be designed to operate on DC power in the event that the vehicle engine stops running, for any reason.

The apparatus can be designed so that the vehicle auxiliary battery can provide electrical power to any and/or all of the vehicle drain/non-drain loads which are connected to same in the event the vehicle engine stops running for any reason. In this regard, the vehicle auxiliary battery can provide power to any of the vehicle systems, equipment systems, devices, or components, in the event that the vehicle engine stops running for any reason.

The primary vehicle battery can also be utilized in order to provide electrical power to the vehicle ignition system and to any number of, or any of, the vehicle non-drain loads. The primary vehicle battery can also be utilized so as to provide electrical power only to the vehicle ignition system.

The apparatus can also be utilized in such a way so that the primary vehicle battery can provide power to the vehicle non-drain loads without providing power to the vehicle ignition system. In this manner, with the vehicle ignition/On switch in the "switch open" state or position or in the "OFF" state or position, and with the main cutoff switch in the "switch closed" state or position or the "ON" state or position, the primary vehicle battery can provide power to the vehicle non-drain loads without providing power to the vehicle ignition system.

The apparatus of the present invention can be utilized in a same, a similar, and/or an analogous, manner, as described herein, in and/or with any application involving any type or kind or vehicles, premises, or articles, which utilize rechargeable batteries to provide electrical power to any type or kind of system, equipment system, component, or device, of the respective vehicle, premises, or article, while also providing electrical power to systems, equipment systems, components, or devices, of the respective vehicle, premises, or article, which require electrical power at all times.

The apparatus and methods of the present invention can also be utilized in electric vehicles, in all-electric vehicles, and in hybrid vehicles, of any and/or all types or kinds, so as to recharge the battery, batteries, or battery pack, of the respective electric vehicle, all-electric vehicle, or hybrid vehicle, in addition to providing any and/or all of the other battery power management functions and/or functionalities described herein as being capable of being provided by apparatus and methods of the present invention. The apparatus and methods of the present invention be utilized in, or in conjunction with, any type or kind of electric, all-electric, or hybrid, vehicles, land vehicles, automobiles, buses, trains, trucks, recreational vehicles, boats, marine vessels, submarines, aircraft, airplanes, jets, helicopters, drones, spacecraft, space shuttles, recreational vehicles, motorcycles, scooters, or any other type or kind of vehicle. Any of the vehicles described herein can be manned vehicles, unmanned vehicles, and/or remote-controlled vehicles.

The apparatus and methods of the present invention can be utilized with, or in conjunction with, any rotating component, or any moving component, of any motor, motor component, electric motor, or electric motor component, transmission, transmission component, differential, differential component, axle, axle component, spindle, spindle component, reduction gear, reducer (defined herein, for purposes of this patent application, as a "type of transmission"), eaxle (defined herein, for purposes of this patent application, as a "vehicle electric drive or electric propulsion system or solution which includes or contains an electric motor, power electronics, and a transmission, for powering a vehicle's axle"), in-wheel motor, in-wheel motor component, and/or a wheel or wheel component, of any electric vehicle, any all-electric vehicle, or any hybrid vehicle, in order to drive a respective alternator or alternators, or in order to drive any generator or generators, so as to generate or produce electricity so as to re-charge the vehicle battery or vehicle batteries of the respective electric vehicle, all-electric vehicle, or hybrid vehicle.

The apparatus and/or the recharging mechanisms provided thereby can also be utilized along with remote control circuitry and/or remote control components which can be utilized in order to remotely open or to remotely close each of the main cutoff switch and the Power On switch, and/or to monitor or to control the battery power management functions or functionalities of the apparatus and methods of the present invention.

The apparatus of the present invention can also be utilized along with any number of alternators and/or generators in order to recharge the vehicle battery and the vehicle auxiliary battery.

The apparatus and methods of the present invention can also be utilized in, on, and/or in connection with, and/or in conjunction with, vehicles of any kinds, types, or sizes, including, but not limited to, vehicles which require, or which may require, a driver, an operator, or a pilot, self-driving vehicles, autonomous vehicles, and/or remote-controlled vehicles, any of which vehicles can also be land vehicles, air vehicles, and/or sea vehicles or marine vehicles, of any kind, type, or size, and including, but not limited to, automobiles, cars, trucks, buses, trains, subway trains, aircraft, airplanes, jets, helicopters, drones, spacecraft, and/or satellites, and/or water vehicles or marine vehicles, boats, ships, submarines, and/or submersible vehicles, or any kind, type, or size.

In this regard, in a preferred embodiment, the apparatus and methods of the present invention can be utilized in, on, and/or in connection with, and/or in conjunction with, vehicles of any kinds, types, or sizes, including, but not limited to, vehicles which require, or which may require, a driver, an operator, or a pilot, self-driving vehicles, autonomous vehicles, and/or remote-controlled vehicles. Further, the apparatus and methods of the present invention can also be utilized in, on, and/or in connection with, and/or in conjunction with, land vehicles, air vehicles, and/or sea vehicles or marine vehicles, of any kind, type, or size. Still further, the apparatus and methods of the present invention can also be utilized in, on, and/or in connection with, and/or in conjunction with, automobiles, cars, trucks, buses, trains, subway trains, aircraft, airplanes, jets, helicopters, drones, spacecraft, and/or satellites, and/or water vehicles or marine vehicles, boats, ships, submarines, and/or submersible vehicles, or any kind, type, or size.

DESCRIPTION OF THE PREFERRED EMBODIMENTS

Figure 1:
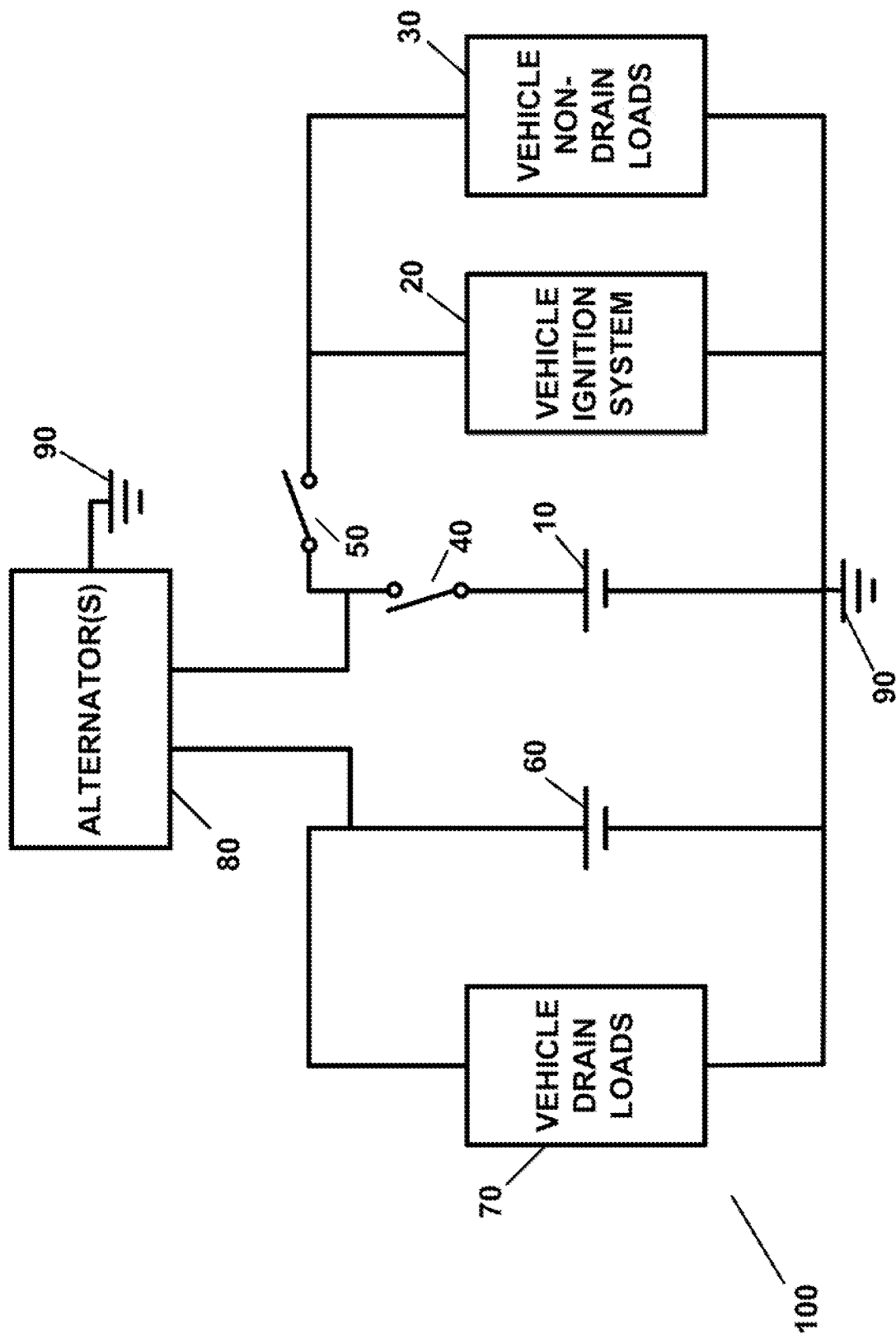
FIG. 1 illustrates a schematic diagram of a preferred embodiment of the apparatus of the present invention.

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise needs to be provided with power when a power source and/or a recharging source ceases to operate, is non-operational, or is turned off, and/or the present invention pertains to a battery power management apparatus and method which can be utilized to generate electric power so as to recharge a battery or batteries of an electric vehicle or a hybrid vehicle, of any type or kind, while the electric vehicle or the hybrid is in use or operating, as well as which can be utilized to conserve battery power and/or battery charge level for an electric vehicle or a hybrid vehicle, of any type or kind, as well as for any electrical systems and/or components of the same, which do not require power when the electric vehicle or the hybrid vehicle is not operating or not in use, while providing power to and/or for electrical systems and/or components which require power when the electric vehicle or the hybrid vehicle is not operating or not in use, or which otherwise need to be provided with power when a power source and/or a battery recharging source ceases to operate or is not operational.

The apparatus and method of the present invention can be utilized in any number of a wide variety of applications, including but not limited to, applications in, or in connection with, motor vehicles, automobiles, trucks, mass transportation vehicles, buses, school buses, trains, subway trains, aircraft, airplanes, jets, gliders, hot air balloons, spacecraft, space shuttles, satellites, boats, marine vehicles, marine vessels, submarines, motorcycles, motor scooters, recreational vehicles (RVs) of any type or kind, mobile homes, jet skis, equipment of any kind or type, or any other vehicle (hereinafter referred to as a "vehicle" or "vehicles"), or in applications in, or in connection with, premises, residential premises, commercial premises, buildings, structures, land, or any land and/or structure of any type or kind (hereinafter referred to as a "premises" or "premises"), or in applications in, with, or in connection with, any article or device (hereinafter "article" or "articles") which utilizes a battery or a DC power source and which is also equipped for, adapted for, or capable of, recharging that battery or DC power source. The apparatus and method of the present invention can be utilized in connection with gasoline-powered vehicles, diesel-powered vehicles, or any other fuel-powered vehicles, combustion engine powered vehicles, electric-powered vehicles, hybrid-powered vehicles, or any other types or kinds of vehicles.

The apparatus and method of the present invention can also provide a apparatus and method for remotely controlling, monitoring, and/or securing the battery power management apparatus of the present invention.

Applicant hereby incorporates by reference herein the subject matter and teachings of U.S. Provisional Patent Application Ser. No. 63/149,530, filed Feb. 15, 2021, and entitled "BATTERY POWER MANAGEMENT APPARATUS AND METHOD", the subject matter and teachings of which are hereby incorporated by reference herein in their entirety.

Applicant hereby incorporates by reference herein the subject matter and teachings of U.S. patent application Ser. No. 14/705,996, filed May 7, 2015, and entitled "BATTERY POWER MANAGEMENT APPARATUS AND METHOD", the subject matter and teachings of which are hereby incorporated by reference herein in their entirety.

Applicant hereby incorporates by reference herein the subject matter and teachings of U.S. Provisional Patent Application Ser. No. 62/025,445, filed Jul. 16, 2014, and entitled "BATTERY POWER MANAGEMENT APPARATUS AND METHOD", the subject matter and teachings of which are hereby incorporated by reference herein in their entirety. Applicant also hereby incorporates by reference herein the subject matter and teachings of U.S. Provisional Patent Application Ser. No. 62/018,687, filed Jun. 30, 2014, and entitled "BATTERY POWER MANAGEMENT APPARATUS AND METHOD", the subject matter and teachings of which are hereby incorporated by reference herein in their entirety.

FIG. 1 illustrates a schematic diagram of a preferred embodiment of the apparatus of the present invention which is designated generally by the reference numeral 100. In a preferred embodiment, the apparatus 100 is illustrated and described as being utilized in, on, or in connection with, a motor vehicle such as, but not limited to, a car, an automobile, or a truck. Although the apparatus 100 of FIG. 1 is illustrated and described as being utilized in, on, or in connection with, a motor vehicle, it is to be understood that the apparatus 100 of the present invention can also be utilized in, on, or in connection with, or can be adapted for and utilized in, on, or in connection with, any of the herein-identified and/or herein-defined vehicles, premises, or articles.

With reference to FIG. 1, the apparatus 100, in a preferred embodiment, includes a primary vehicle battery 10 which can be connected to or with, or which is connectable to and/or with, the vehicle ignition system as well as any other vehicle electrical system or device or vehicle electronic system or device of the vehicle and which does not draw electrical power or current when the vehicle or the vehicle ignition system is not in use (hereafter collectively referred to as "non-drain loads 30"). In a preferred embodiment, the primary vehicle battery 10 can be any battery or DC power source which is suitable for use in, on, or in connection with, the particular vehicle. For example, if the vehicle is an automobile, the primary vehicle battery 10 can be any 12 Volt battery typically utilized as an automobile battery.

With reference once again to FIG. 1, the primary vehicle battery 10 can be electrically connected with, or coupled to, the vehicle ignition system 20 in any appropriate circuit configuration, such as, but not limited to, a parallel connection or a series connection, or any combination of same, and to any number of any of the other non-drain loads in, on, or of, the vehicle, which are collectively designated by the reference numeral 30 in any appropriate circuit configuration, such as, but not limited to, a parallel connection or a series connection. The vehicle non-drain loads 30 can be any electrical circuit, system, equipment system, device, or component, which requires electrical power when the vehicle, or any electrical circuit, system, equipment system, device, or component, is in use or is being operated.

In a preferred embodiment, the apparatus 100 and the circuitry of the vehicle can be designed and implemented so that the vehicle ignition system 20 and all of the vehicle non-drain loads 30, and any associated or corresponding vehicle systems, equipment systems, components, and devices, are to be provided with electrical power from the primary vehicle battery 10.

With reference once again to FIG. 1, the apparatus 100 also includes a main cutoff switch 40 which is connected in series with the primary vehicle battery, as shown. In a preferred embodiment, the main cutoff switch 40 serves to disconnect the primary vehicle battery 10 from all vehicle circuits and/or devices including, but not limited to, the vehicle ignition system 20 and the vehicle non-drain loads 30. In this regard, the cutoff switch 40 can be utilized to completely and electrically disconnect the primary vehicle battery 10 from any and all loads in, on, or connected with, the vehicle.

In a preferred embodiment, the main cutoff switch 40 can be a manual switch which can be placed at any suitable or convenient location in or on the vehicle and/or the main cutoff switch 40 can also be a remotely controlled switch, such as those typically utilized in connection with remote controlled vehicle starters or remote controlled vehicle ignition systems. In this regard, in a preferred embodiment, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by a receiver or any other appropriate controller, control device, computer, or other device, which can cause the main cutoff switch 40 to close in order to remotely enable the vehicle to be utilized, or the can cause the main cutoff switch to open so as to disable vehicle operation. In FIG. 1, the main cutoff switch 40 is shown in the "switch open" or "OFF" state or position.

With reference once again to FIG. 1, the apparatus 100 also includes a vehicle ignition/On switch 50, which is connected in series with the primary vehicle battery 10, as shown, and which can be utilized to electrically connect or electrically disconnect the primary vehicle battery 10 to or from each of to the vehicle ignition system 20 and/or to or from each of any number of the non-drain loads 30. The vehicle ignition/On switch 50 can also be utilized to selectively activate the vehicle ignition system 20 in order to start the vehicle engine and/or to activate, and/or to enable an activation of, any one or more of any of the vehicles systems, equipment systems, devices, or components, and/or any vehicle non-drain loads 30, of the vehicle and/or to activate, and/or to enable the activation of, any one or more of the electrical circuits, systems, equipment systems, devices, or components, and/or any vehicle non-drain loads 30, of the vehicle which require electrical power for use or operation.

In a preferred embodiment, the vehicle ignition/On switch 50 can be a manual switch, such as those which are typically utilized in connection with a vehicle key and/or the vehicle ignition/On switch 50 can also be a remotely controlled switch, such as those typically utilized in connection with remote controlled vehicle starters or remote controlled vehicle ignition systems. In this regard in a preferred embodiment, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by the receiver or any other appropriate controller, control device, computer, or other device, which can cause the vehicle ignition/On switch 50 to close in order to remotely start the vehicle's engine or can, in and under appropriate and safe circumstances, such when the vehicle engine is off, cause the vehicle ignition/On switch 50 to open so as to disable vehicle operation or vehicle engine operation. In FIG. 1, the vehicle ignition/On switch 50 is shown in the "switch open" or "OFF" state or position.

With reference once again to FIG. 1, the apparatus 100, in a preferred embodiment, also includes, a vehicle auxiliary battery 60, as shown. In a preferred embodiment, the vehicle auxiliary battery 60 can be the same as, or can be of the same type or kind of battery or DC power source as the primary vehicle battery 10. In a preferred embodiment, both of the primary vehicle battery 10 and the vehicle auxiliary battery 60 can be 12 volt automobile batteries, in the case where the vehicle is an automobile, which can have similar, if not identical, specifications and which can be recharged from, by, with, or using, the same electrical vehicle alternator described herein. The vehicle auxiliary battery 60 is connected in series or in parallel with each of all of the vehicle devices, equipment, equipment systems, or components, which typically drain current from a vehicle battery when the vehicle or the vehicle ignition system is not in operation or "off" (hereinafter collectively referred to as the "drain loads 70").

In a preferred embodiment, the drain loads 70 can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times. In this regard, the drain loads 70 can include, but are not limited to, a vehicle anti-theft system, a vehicle radio memory storage system or device, a radio clock, any command computer or command computers, remote door opening systems, or devices, remote control systems or devices, or any other systems, equipment systems, devices, or components, which are known to drain electrical power at all times and which can drain a vehicle battery of current and deplete its charge or charge level when a vehicle is typically not in use or is not operating.

In a preferred embodiment, the apparatus 100 and the circuitry of the vehicle can be designed and implemented so that the vehicle drain loads 70 and any associated or corresponding vehicle systems, equipment systems, components, and devices, are to be provided with electrical power from the vehicle auxiliary battery 60.

With reference once again to FIG. 1, the apparatus 100 can also be connected to or with the vehicle alternator 80, which alternator is typically equipped to, and also used in order to, perform a number of functions including, but not limited to, recharging the battery of a vehicle, and which can be utilized in the apparatus 100 of the present invention in order to continuously re-charge each of the primary vehicle battery 10 and the vehicle auxiliary battery 60 of the apparatus 100 of the present invention. In a preferred embodiment, a single vehicle alternator 80 can be used to recharge both the primary vehicle battery 10 and the vehicle auxiliary battery 60. In another preferred embodiment, two alternators can also be utilized so that one alternator 80 can be utilized to charge the primary vehicle battery 10 and so that the other alternator 80 can be utilized to charge the vehicle auxiliary battery 60. In a preferred embodiment, any pertinent circuits, components, or devices, of the alternator 80 can be connected between each respective electrical circuit or connector(s) associated with the recharging of each of the primary vehicle battery 10 and the vehicle auxiliary battery 60 and a vehicle ground 90 as needed or desired. In a preferred embodiment, the apparatus 100 can also be connected to the vehicle ground 90 as needed or desired.

In a preferred embodiment in which two alternators 80 are employed, one of the alternators can be dedicated for performing all of the functions of a typical vehicle alternator as well as, and including, recharging the primary vehicle battery 10 and providing electrical power to the vehicle ignition system 20, the vehicle non-drain loads 30, or any electrical circuit, system, equipment system, device, or component, of the vehicle which requires electrical power when the vehicle, or any electrical circuit, system, equipment system, device, or component, is in use or is being operated, while the second alternator can be dedicated for recharging the vehicle auxiliary battery 60 and, if needed or desired, for performing any other functions such as providing electrical power to any of the drain loads 70 of the vehicle. In an embodiment in which two alternators 80 are utilized, the first alternator 80 can be connected to vehicle ground 90 and to each of the various vehicle electrical circuits needed for providing any needed electrical power to the various electrical circuits, systems, equipment systems, devices, or components, of, in, on, or associated with, the vehicle and for recharging the primary vehicle battery 10, while the second alternator 80 can be connected to vehicle ground 90 and to any vehicle electrical circuit(s) needed for recharging the vehicle auxiliary battery 60 as well as to any other electrical circuit(s) for which the second alternator 80 is being utilized to supply electrical power.

Figure 2:
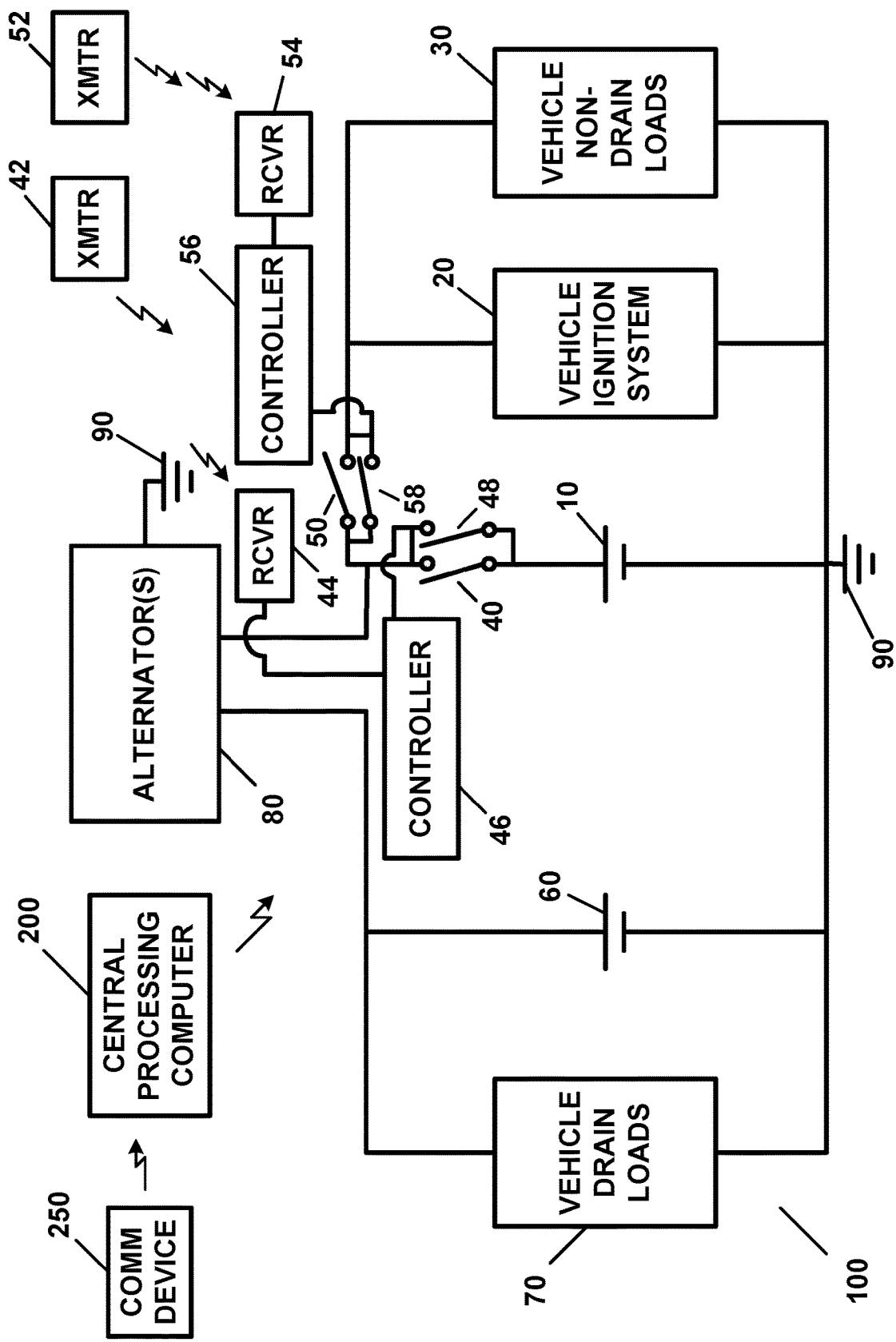
FIG. 2 illustrates another preferred embodiment of the apparatus of FIG. 1.

FIG. 2 illustrates another preferred embodiment of the apparatus 100 of FIG. 1. With reference to FIG. 2, the apparatus 100 includes all of the components of the apparatus 100 of FIG. 1 along with the addition of remote control circuitry and/or remote control components which can be utilized in order to remotely open or to remotely close each of the main cutoff switch 40 and the vehicle ignition/On switch 50.

With reference to FIG. 2, the apparatus 100 can include a transmitter 42, which can be any type or kind of remote control transmitter for opening or closing the circuit controlled by the main cutoff switch 40 and which, in a preferred embodiment, can be integrated into and/or with a vehicle remote control device, a key chain, or a key fob, or any other device, a receiver 44 located at, in, or on, the vehicle, for receiving a signal, signals, or sequence of signals, transmitted from the transmitter 42 and indicative of a main shutoff switch opening operation or a main cutoff switch closing operation, a controller 46 for processing any signal, signals, or sequence of signals, received by the receiver 44, and an electronically activated switching device 48 which can located in parallel with the main cutoff switch 40, which can serve to close or open the circuit controlled by the main cutoff switch 40. In a preferred embodiment, the electronically activated switching device 48 can be placed in parallel with the main cutoff switch 40 so that it can simply bypass the main cutoff switch 40 in a preferred embodiment.

With reference once again to FIG. 2, the apparatus 100 can include a transmitter 52, which can be any type or kind of remote control transmitter for opening or closing the circuit controlled by the vehicle ignition/On switch 50 and which, in a preferred embodiment, can also be integrated into and/or with a vehicle remote control device, a key chain, or a key fob, or any other device, a receiver 54 located at, in, or on, the vehicle, for receiving a signal, signals, or sequence of signals, transmitted from the transmitter 52 and indicative or a vehicle ignition switch opening operation or a vehicle ignition switch closing operation, a controller 56 for processing any signal, signals, or sequence of signals, received by the receiver 54, and an electronically activated switching device 58 which can located in parallel with the vehicle ignition/On switch 50, which can serve to close or open the circuit controlled by the vehicle ignition/On switch 50. In a preferred embodiment, the electronically activated switching device 58 can be placed in parallel with the vehicle ignition/On switch 50 so that it can simply bypass the vehicle ignition/On switch 50 in a preferred embodiment.

In a preferred embodiment, the transmitter 42 and/or the transmitter 52 can also be implemented by, replaced by, or used in conjunction with, a central processing computer or an Internet server 200 (hereinafter "central processing computer 200"), which can be associated with a web site. In another preferred embodiment, any authorized user or authorized person can utilize any suitable communication device 250, which, in a preferred embodiment, can be a personal computer, a tablet, a tablet computer, a laptop computer, a notebook computer, a cellular telephone, a wireless telephone, a personal digital assistant, or any other suitable device, in order transmit any respective signal, signals, or sequence of signals, to the respective receiver 44 and/or to the respective receiver 54 via the central processing computer 200 on, over, or via, the Internet and/or the World Wide Web, and/or on or over any other communication network(s), wireless communication network(s), or any combination of same. In this regard, in a preferred embodiment, any authorized user or authorized person can use or control the apparatus 100 of the present invention on, over, or via, the Internet and/or the World Wide Web and/or any other communication network(s), wireless communication network(s), or any combination of same.

The apparatus 100 of the present invention can be utilized in order to provide and to perform battery power management in and for any of the herein-described vehicles, premises, or articles, by providing, and/or by allowing for, the electrical powering of any electrical devices which typically require electrical power at all times and/or when the respective vehicle, premises, or article, is not operating and/or not in use, while, at the same time, conserving the power of the main battery of the vehicle, the premises, or the article, which is needed to activate and operate the vehicle, the premises, or the article, when same is desired to be used and/or in use. In a preferred embodiment, the use and operation of the apparatus 100 of the present invention can be described and illustrated in connection with use in a vehicle, such as an automobile. Although described and illustrated as being used and operated in connection with an automobile, it is important to note that the apparatus 100 can be utilized in, with, or in conjunction with, any vehicle, premises, or article.

Figure 3:
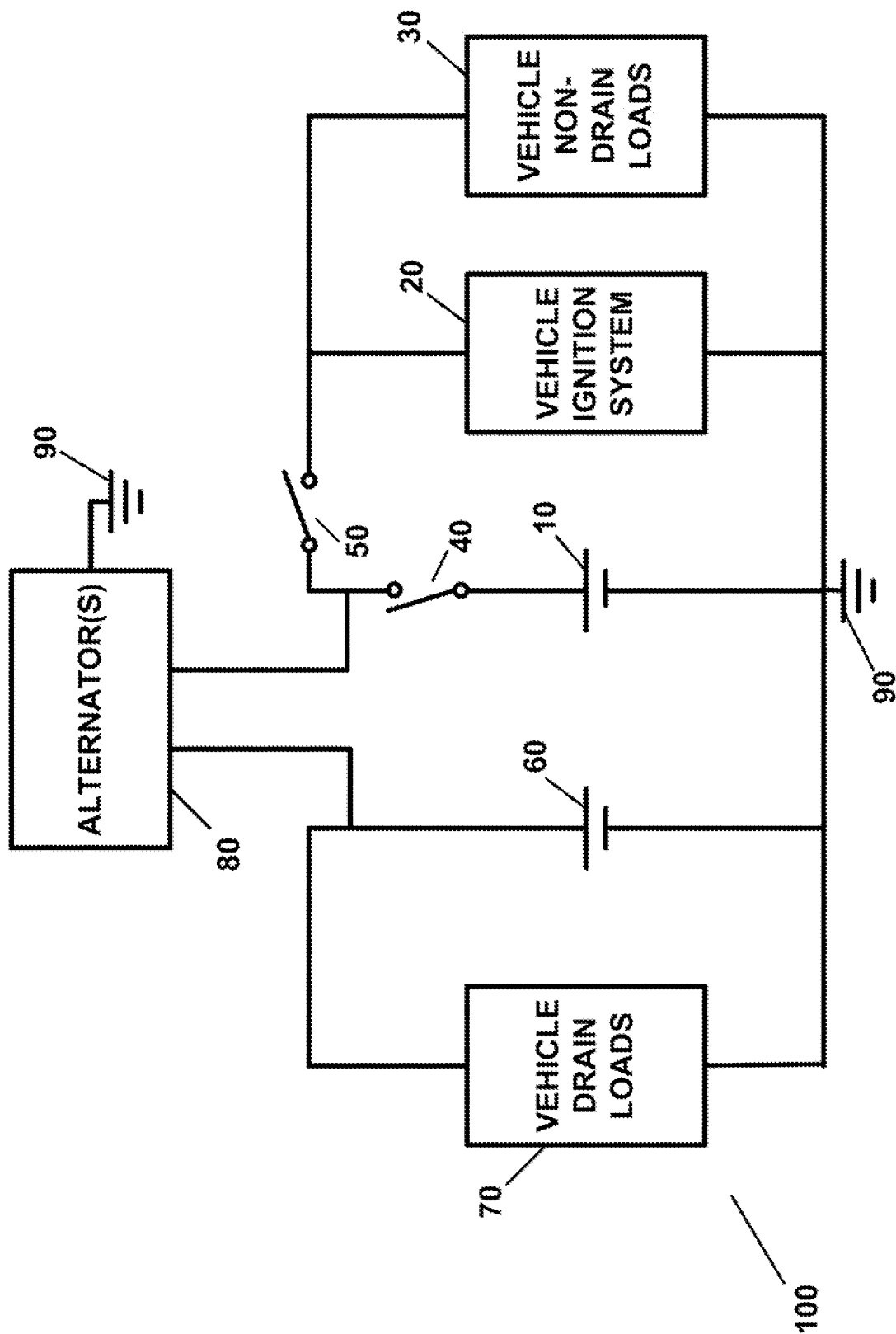
FIG. 3 illustrates the apparatus of FIG. 1 showing the main cutoff switch and the vehicle ignition switch both in the "switch open" state or position or in the "OFF" state or position.

FIG. 3 illustrates the apparatus 100 of FIG. 1 showing the main cutoff switch 40 and the vehicle ignition switch 50 both in the "switch open" state or position or in the "OFF" state or position. In the embodiment of FIG. 3, which is indicative of the vehicle not being in use, the primary vehicle battery is completely disconnected from the vehicle ignition system 20 and the vehicle non-drain loads 30, which vehicle non-drain loads 30 can be any electrical circuit, system, equipment system, device, or component, which requires electrical power when the vehicle, or any electrical circuit, system, equipment system, device, or component, is in use or is being operated. When the primary vehicle battery 10 is completely disconnected from the vehicle ignition system 20 and the vehicle non-drain loads 30, as shown in FIG. 3, the electrical power and/or the charge level of the primary vehicle battery 10 is conserved for later use. The apparatus 100, when utilized as shown in FIG. 3, provides the advantage that no electrical power is drained from the primary vehicle battery 10 when the vehicle is not operating or not in use, thereby conserving the charge level and the electrical power of the primary vehicle battery 10 for later use.

The apparatus 100, when utilized as shown in FIG. 3, can also function as a vehicle anti-theft device for the vehicle as no electrical power can be provided to the vehicle ignition system 20 when the main cutoff switch is in the "switch open" or "OFF" state or position. Even if one were to gain access to a vehicle key or otherwise attempt to bypass the vehicle ignition/On switch 50, the primary vehicle battery 10 will remain disconnected from the vehicle ignition system 20 and from the vehicle non-drain loads 30 when the main cutoff switch is in the "switch open" or "OFF" state or position. In this manner, the apparatus 100 of the present invention can also be utilized as a vehicle anti-theft system or device.

With reference once again to FIG. 3, the vehicle auxiliary battery 60 provides electrical power to any and/or all of the drain loads 70 which typically draw electrical power at all times and/or when the vehicle is in use, or operating, as well as when the vehicle is not in use or not operating. As noted above, the drain loads 70 can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times.

In this regard, when used as shown in FIG. 3, the apparatus 100 can serve to provide electrical power to the drain loads 70 from the vehicle auxiliary battery 60 while conserving the charge level and electrical power capacity of the primary vehicle battery 10. As noted above, the apparatus 100 of FIG. 3 also serves an anti-theft function and/or a theft-deterrence function for the vehicle as the primary vehicle battery 10 is, and remains, completely disconnected from the vehicle ignition system 20 in the embodiment of FIG. 3 when the main cutoff switch is in the "switch open" state or position or in the "OFF" state or position.

The embodiment of FIG. 3 also illustrates an exemplary embodiment wherein the apparatus 100 can be utilized to provide security against a theft or an unauthorized use of the vehicle simply by the main cutoff switch 40 being maintained in the "switch open" or "OFF" state or position.

Figure 4:
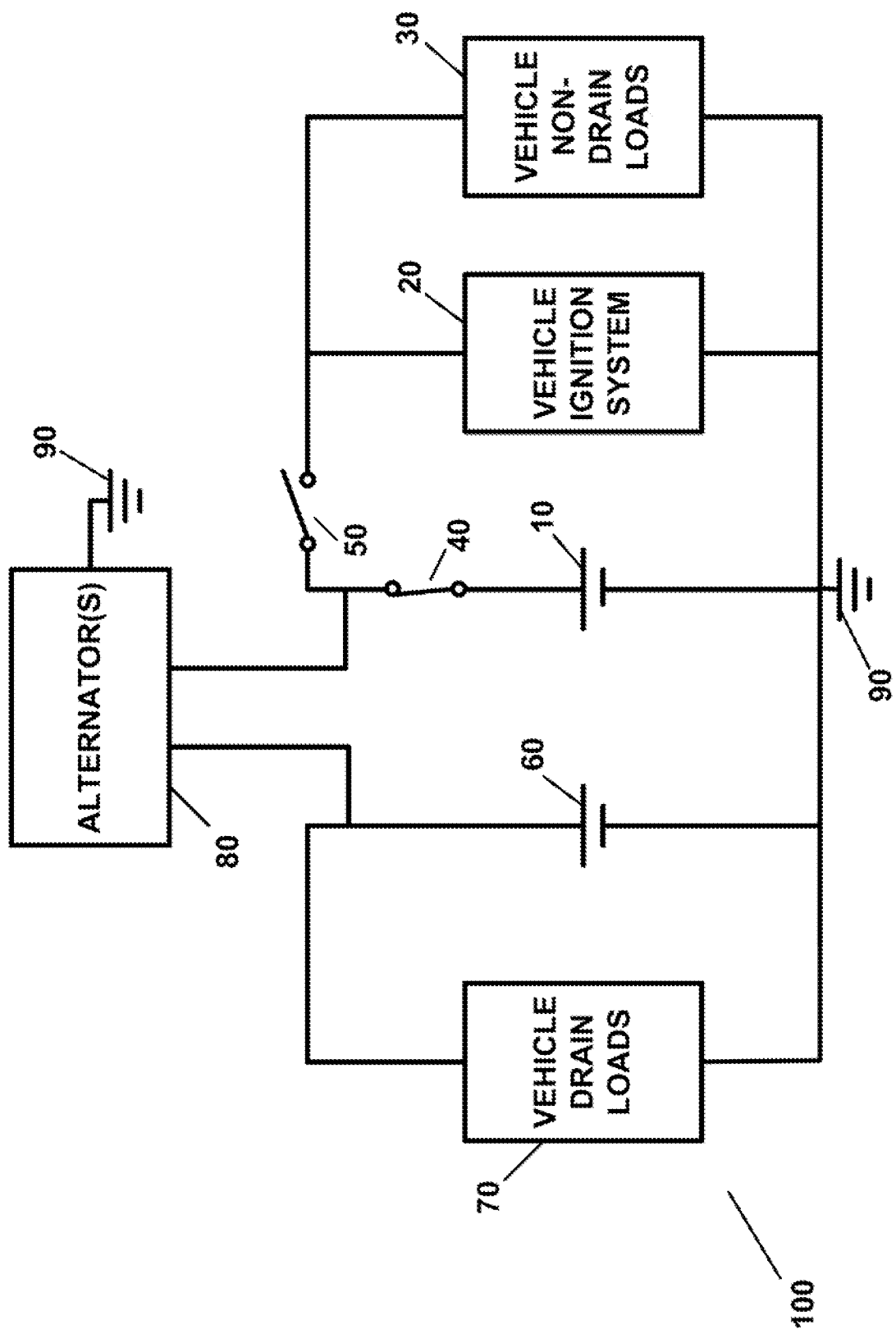
FIG. 4 illustrates the apparatus of FIG. 1 showing the main cutoff switch in the "switch closed" state or position or the "ON" state or position and showing the vehicle ignition/On switch in the "switch open" state or position or in the "OFF" state or position.

FIG. 4 illustrates the apparatus 100 of FIG. 1 showing the main cutoff switch 40 in the "switch closed" state or position or the "ON" state or position and showing the vehicle ignition/On switch 50 in the "switch open" state or position or in the "OFF" state or position. When the main cutoff switch 40 is in the "switch closed" state or position or the "ON" state or position, the primary vehicle battery 10 is capable of providing electrical power to the vehicle ignition system 20 and to any of the vehicle non-drain loads 30 described herein, and/or to any of the vehicle's systems, equipment systems, components, or devices, which can be powered by the primary vehicle battery 10, upon, and/or subject to, the closing of the vehicle ignition/On switch 50.

Figure 5:
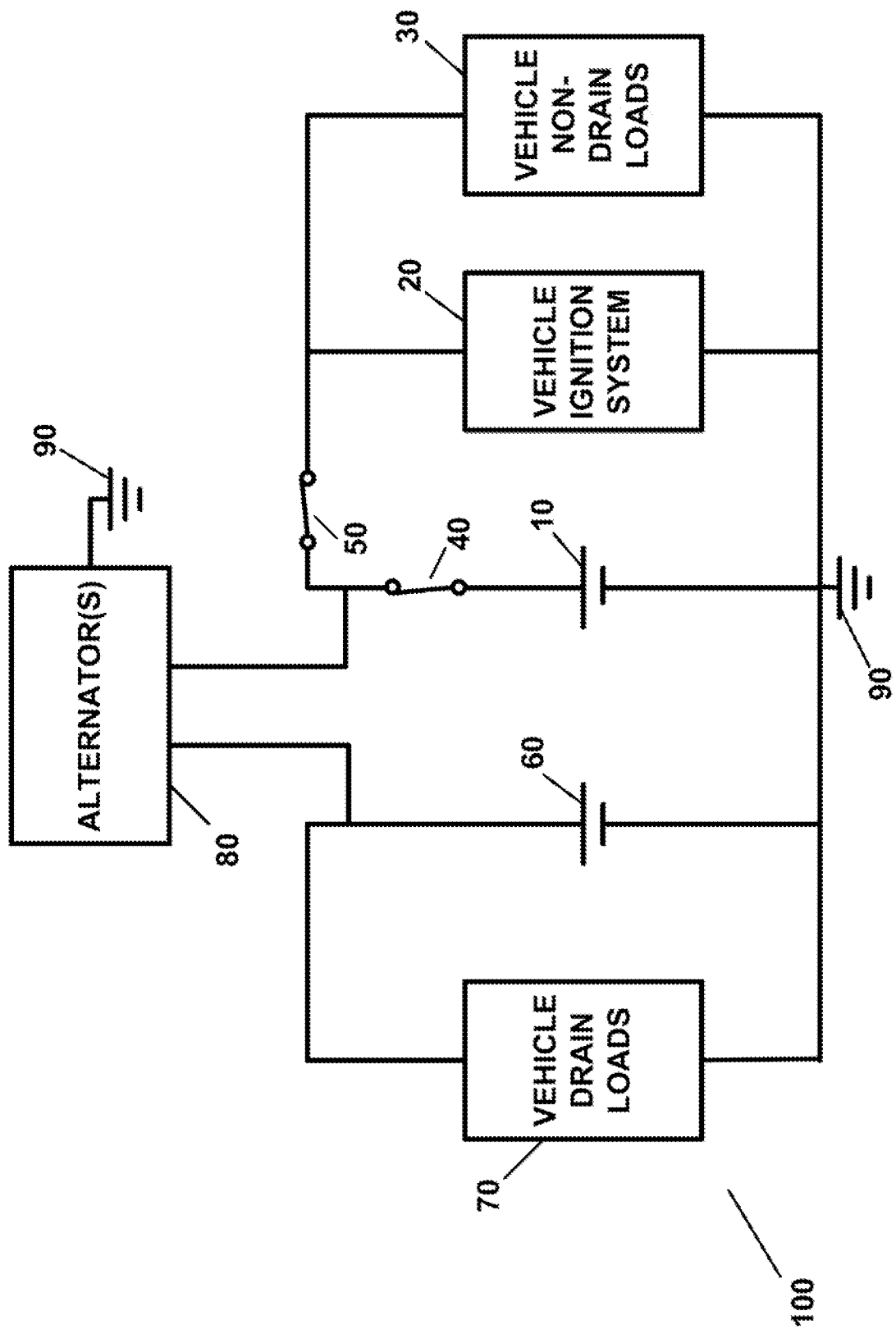
FIG. 5 illustrates the apparatus of FIG. 1 showing both the main cutoff switch and the vehicle ignition/On switch in the "switch closed" state or position or in the "ON" state or position.

FIG. 5 illustrates the apparatus 100 of FIG. 1 showing both the main cutoff switch 40 and the vehicle ignition/On switch 50 in the "switch closed" state or position or in the "ON" state or position. With reference to FIG. 5, with the main cutoff switch 40 being closed or in the "ON" position, an operator can start the vehicle's engine by closing the vehicle ignition/On switch 50. Once the vehicle engine is running, the primary vehicle battery 10 can provide electrical power to or for the vehicle ignition system 20 as well as to or for to any of the vehicle non-drain loads 30 described herein, and/or to any of the vehicle's systems, equipment systems, components, or devices.

During vehicle engine operation, the alternator 80 or alternators 80, if more than one alternator is utilized, and/or any respective component(s) of the alternator 80 or alternators 80, will be driven by the vehicle engine in order to generate electrical power which can include both an alternating current (AC) power and a direct current (DC) power. If a single alternator 80 is utilized, then the alternator 80 will re-charge both the primary vehicle battery 10 and the vehicle auxiliary battery 60 during vehicle engine operation and will also provide electrical power to or for any of the vehicle non-drain loads 30 or drain loads 70 described herein, and/or to any of the vehicle's systems, equipment systems, components, or devices. If two alternators are utilized, then one alternator 80 can be connected to, and can re-charge, the primary vehicle battery 10, and can provide AC and/or DC power to any of the vehicle non-drain loads 30 described herein, and/or to any of the vehicle's systems, equipment systems, components, or devices, while the other alternator 80 can be connected to, and can re-charge, the vehicle auxiliary battery 60, and can provide AC and/or DC power to any of the vehicle's drain loads 70. In this regard, both the primary vehicle battery 10 and the vehicle auxiliary battery 60 can be re-charged during vehicle engine operation.

In a preferred embodiment, the apparatus 100 provides the vehicle auxiliary battery 60 which can provide any and/or all of the vehicle drain loads 70 with electrical power when the vehicle engine is off or not running, while preserving and/or conserving the battery charge level of the primary vehicle battery 10 which can be completely disconnected from any electrical power or current drain loads, from the vehicle ignition system, and/or from any of the vehicle non-drain loads 30 described herein, and/or from any of the vehicle's system, equipment systems, components, or devices. The apparatus 100 provides a primary vehicle battery 10 which can be completely disconnected from any load, from the vehicle ignition system 20, from any of the vehicle non-drain loads 30 described herein, and/or to any of the vehicle's system, equipment systems, components, or devices, and/or from any of the vehicle drain loads 70, when the vehicle engine is not running, thereby maintaining a maximum charge level for the primary vehicle battery 10. Even if the charge level of the vehicle auxiliary battery 60 should become depleted during a period of non-use of the vehicle engine, the primary vehicle battery 10 can always have a sufficient charge level to start the vehicle engine and the respective vehicle alternator(s) 80 can re-charge the vehicle auxiliary battery 60 as well as can re-charge the primary vehicle battery 10.

Use of the apparatus 100 of the present invention can be optimized if the main cutoff switch 40 is opened, and, therefore, placed in the "switch open" state or position or in the "OFF" state or position, immediately after the vehicle engine is turned off and thereby returned to the "switch closed" state or position or the "ON" state or position just prior to attempting to start the vehicle engine or just prior to otherwise turning the vehicle, or any vehicle system, equipment system, component, or device, "ON", by closing the vehicle ignition/On switch 50, such as by switching the vehicle ignition/On switch 50 to the "switch closed" state or position or to the "ON" state or position, or by otherwise simply turning and ignition key or pushing an ignition button or switch. In this regard, the primary vehicle battery 10 can be "connected" when use of the vehicle, the vehicle engine, or any vehicle system, equipment system, component, or device powered by the primary vehicle battery, is desired, and the primary battery 10 can be "disconnected" when use of the vehicle, the vehicle engine, or any vehicle system, equipment system, component, or device, which is powered by the primary vehicle battery 10, has ceased and/or is no longer desired. Substantial anti-theft advantages are also realized by the apparatus 100 of the present invention as the vehicle engine will not be capable of being activated or started with the primary vehicle battery 10 being disconnected from the vehicle ignition system 20.

In the manner described herein, the apparatus 100 of the present invention provides a novel battery power management apparatus and method which can be utilized in order to provide an apparatus 100 or system which can be utilized to ensure that a charge level of a primary vehicle battery 10 can always be maintained, while allowing for sufficient electrical power to be provided to vehicle systems, equipment systems, components, or devices, which require and which continue to draw electrical power when the vehicle's engine is not running. In this regard, by using the apparatus 100 of the present invention, one can ensure that drain loads 70 or short circuits will not cause a primary vehicle battery 10 to discharge or to be depleted of its charge and/or "go dead" while also ensuring that any and/or all vehicle systems, equipment systems, components, or devices, which require electrical power at all times and/or when the vehicle engine is not running are provided with the electrical power needed to ensure their proper operation.

Figure 6:
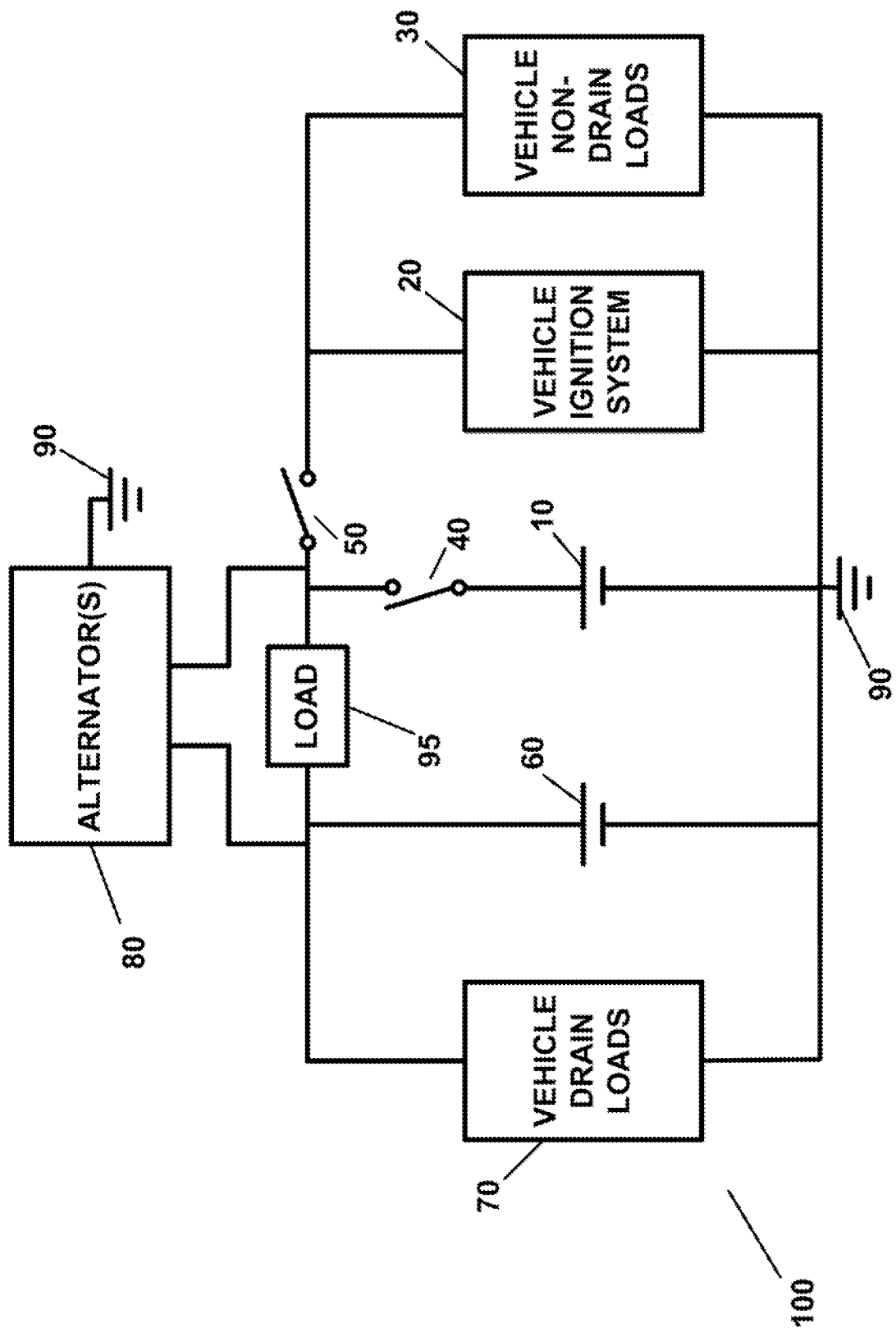
FIG. 6 illustrates another preferred embodiment of the apparatus of FIG. 1.

In another preferred embodiment, the vehicle auxiliary battery 60 can be utilized to provide electrical power to the circuit portion of the apparatus 100 which is connected to the primary vehicle battery 10 while the primary vehicle battery 10 can be utilized to provide electrical power to the circuit portion of the apparatus 100 which is connected to the vehicle auxiliary battery 60. FIG. 6 illustrates another preferred embodiment of the apparatus 100 of FIG. 1. In the embodiment of FIG. 6, the apparatus 100 can also include a voltage stabilizing load or resistor 95 (hereinafter "resistor 95" or "load 95") which can be utilized and which can be inserted between the circuit portion of the apparatus 100 which is powered by the primary vehicle battery 10 and the circuit portion of the apparatus 100 which is powered by the vehicle auxiliary battery 60 in order to connect the two circuit portions together. The resistor 95 can be connected in between the positive sides of each of the primary vehicle battery 10 and the vehicle auxiliary battery 60, as shown in FIG. 6.

With the use of the resistor 95, electrical power can be provided from the vehicle auxiliary battery 60 to the vehicle ignition system 20 and to the vehicle non-drain loads 30, if desired, when the vehicle ignition/On switch 50 is in the "switch closed" state or position or in the "ON" state or position, whether or not the main cutoff switch 40 is in the "switch closed" or "ON" state or position or in the "switch open" or "OFF" state or position. When the main cutoff switch 40 is in the "switch closed" state or position or in the "ON" state or position, electrical power can also be provided from the primary vehicle battery 10 to the vehicle drain loads 70, if desired. The resistor 95 serves to connect the two circuit portions together while providing a stabilizing voltage drop across same in the event that the respective voltages of the primary vehicle battery 10 and the vehicle auxiliary battery 60 are not equal.

In another preferred embodiment, the apparatus 100 and method of the present invention can also be utilized in order to provide power to any vehicle systems, equipment systems, devices, or components, in the event that the vehicle engine stops running, for any reason, which can result in the loss of the power being provided to any vehicle systems, vehicle equipment systems, devices, or components, which require power for the safe operation of the vehicle and/or for operator and/or occupant safety.

Figure 7:
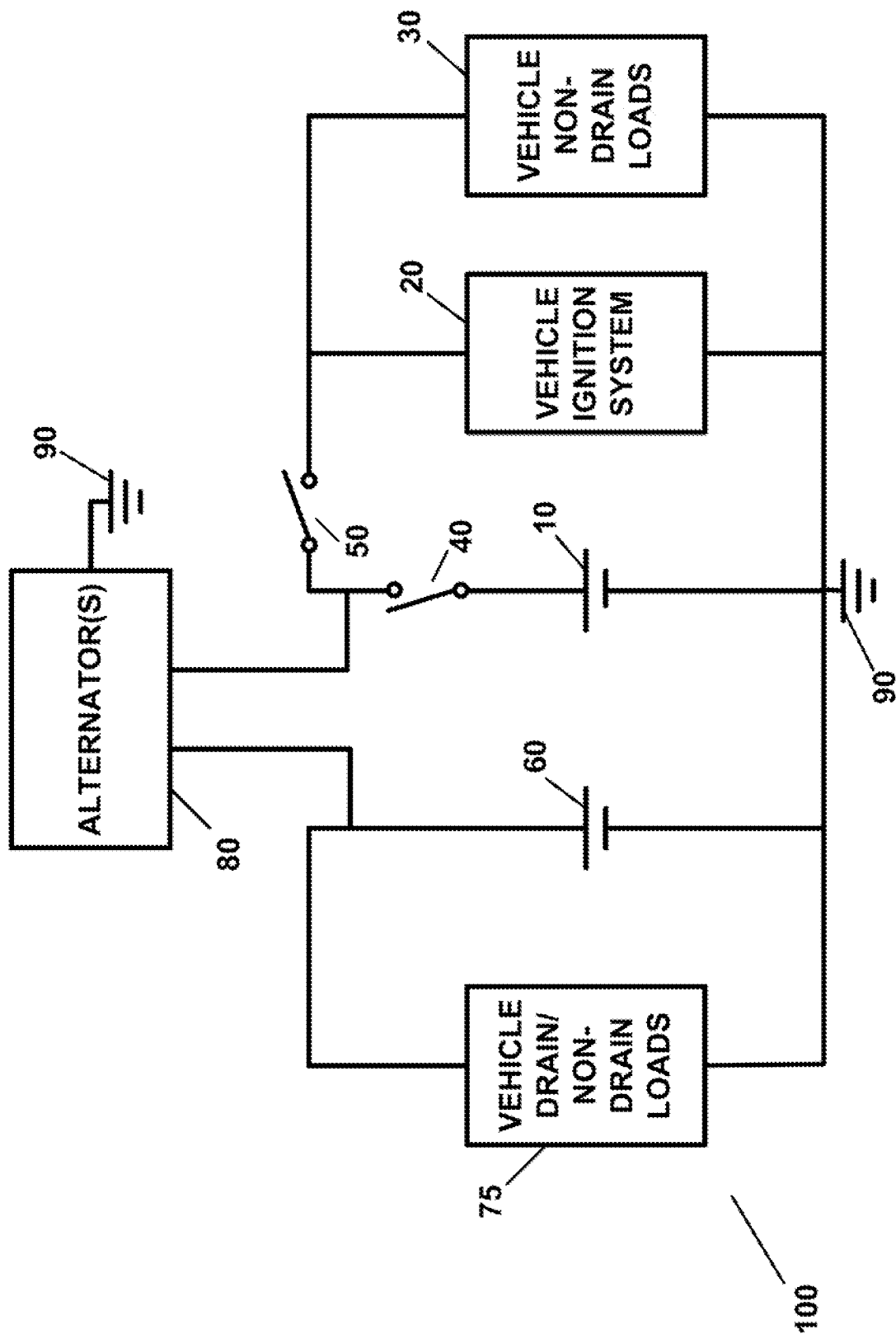
FIG. 7 illustrates still another preferred embodiment of the apparatus of FIG. 1.

FIG. 7 illustrates another preferred embodiment of the apparatus 100 of FIG. 1. In FIG. 7, the vehicle auxiliary battery 60 provides electrical power to the vehicle drain/non-drain loads 75. In a preferred embodiment, the vehicle drain/non-drain loads 75 include any and/or all of the vehicle drain loads 70 as well as any loads which can be, or which can include any of the vehicle systems, equipment systems, devices, or components, such as, but not limited to, the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, and/or the vehicle's emergency communication systems, and/or any other load, or vehicle system, equipment system, device, or component. In a preferred embodiment, any of the vehicle drain/non-drain loads 75 can be designed to operate on DC power in the event that the vehicle engine stops running, for any reason.

With reference to FIG. 7, the apparatus 100 is designed so that the vehicle auxiliary battery 60 can provide electrical power to any and/or all of the vehicle drain/non-drain loads 75 which are connected to same in the event the vehicle engine stops running for any reason. In this regard, the vehicle auxiliary battery 60 can provide power to any of the loads, vehicle systems, equipment systems, devices, or components, in the event that the vehicle engine stops running for any reason.

In another preferred embodiment, the primary vehicle battery 10 can be utilized in order to provide electrical power to the vehicle ignition system 20 and to any number of, or any of, the vehicle non-drain loads 30. In yet another preferred embodiment, the primary vehicle battery 10 can also be utilized so as to provide electrical power only to the vehicle ignition system 20.

Figure 8:
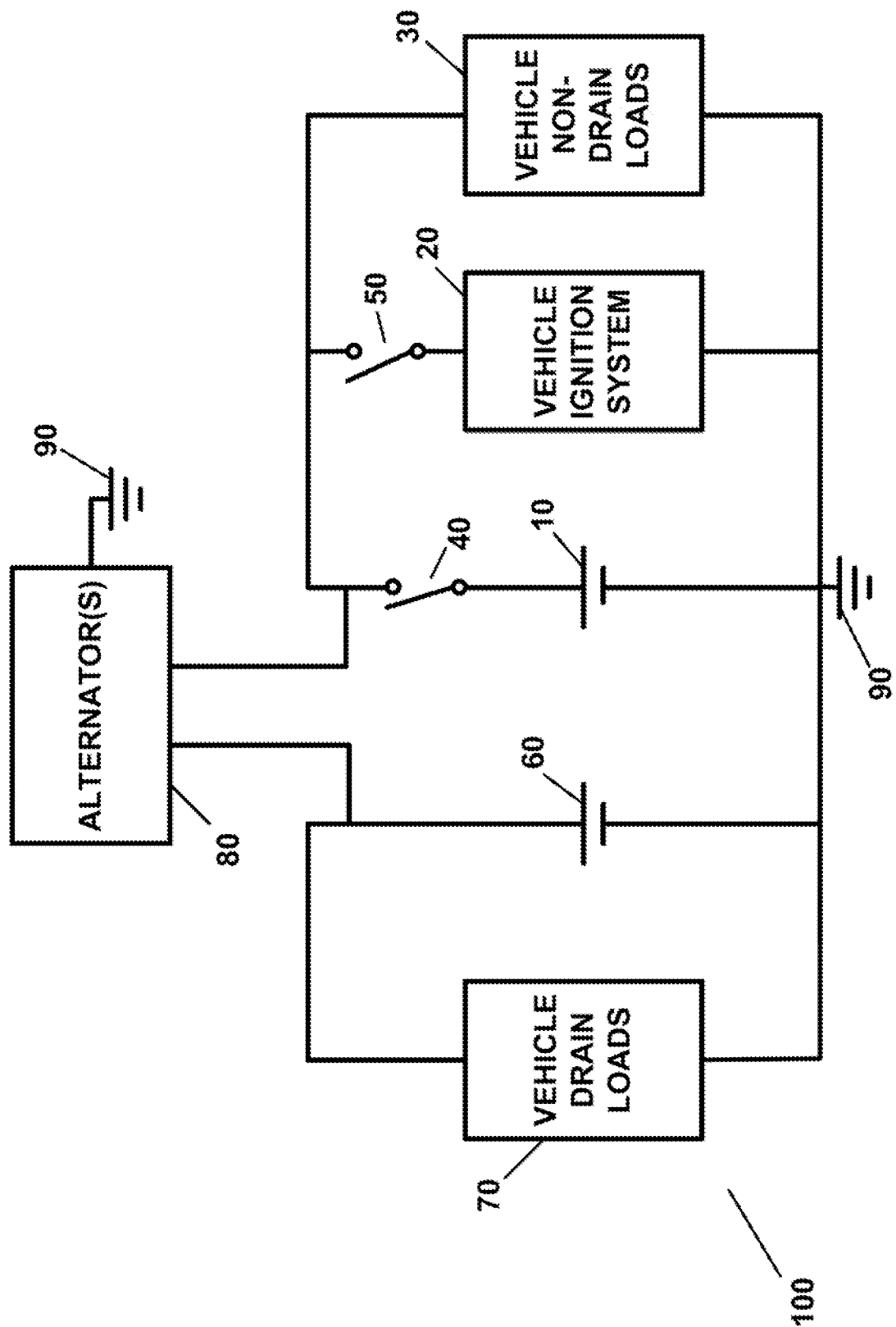
FIG. 8 illustrates yet another preferred embodiment of the apparatus of FIG. 1.

In another preferred embodiment, the apparatus 100 can also be utilized in such a way so that the primary vehicle battery 10 can provide power to the vehicle non-drain loads 30 without providing power to the vehicle ignition system 20. FIG. 8 illustrates another preferred embodiment of the apparatus 100 of FIG. 1. With reference to FIG. 8, the vehicle ignition/On switch 50 is situated at the location shown. In this manner, with the vehicle ignition/On switch 50 in the "switch open" state or position or in the "OFF" state or position, and with the main cutoff switch in the "switch closed" state or position or in the "ON" state or position, the primary vehicle battery 10 can provide power to the vehicle non-drain loads 30 without providing power to the vehicle ignition system 20.

The apparatus 100 of the present invention can be utilized in a same, a similar, and/or an analogous, manner, as described herein, in and/or with any application involving any type or kind or vehicles, premises, or articles, which utilize rechargeable batteries to provide electrical power to any type or kind of system, equipment system, component, or device, of the respective vehicle, premises, or article, while also providing electrical power to systems, equipment systems, components, or devices, of the respective vehicle, premises, or article, which require electrical power at all times.

In another preferred embodiment, as well as in any and/or all of the other embodiments described herein, the apparatus and methods of the present invention can also be utilized in electric vehicles, in all-electric vehicles, and in hybrid vehicles, of any and/or all types or kinds, so as to recharge the battery, batteries, or battery pack, of the respective electric vehicle, all-electric vehicle, or hybrid vehicle, in addition to providing any and/or all of the other battery power management functions and/or functionalities described herein as being capable of being provided by apparatus and methods of the present invention. In a preferred embodiment, the apparatus and methods of the present invention be utilized in, or in conjunction with, any type or kind of electric, all-electric, or hybrid, vehicles, land vehicles, automobiles, buses, trains, trucks, recreational vehicles, boats, marine vessels, submarines, aircraft, airplanes, jets, helicopters, drones, spacecraft, space shuttles, recreational vehicles, motorcycles, scooters, or any other type or kind of vehicle. In a preferred embodiment, any of the vehicles described herein can be manned vehicles, unmanned vehicles, and/or remote-controlled vehicles.

In a preferred embodiment, the apparatus and methods of the present invention can be utilized with, or in conjunction with, any rotating component, or any moving component, of any motor, motor component, electric motor, or electric motor component, transmission, transmission component, differential, differential component, axle, axle component, spindle, spindle component, reduction gear, reducer (defined herein, for purposes of this patent application, as a "type of transmission"), eaxle (defined herein, for purposes of this patent application, as a "vehicle electric drive or electric propulsion system or solution which includes or contains an electric motor, power electronics, and a transmission, for powering a vehicle's axle"), in-wheel motor, in-wheel motor component, and/or a wheel or wheel component, of any electric vehicle, any all-electric vehicle, or any hybrid vehicle, in order to drive a respective alternator or alternators, or in order to drive any generator or generators, so as to generate or produce electricity so as to re-charge the vehicle battery or vehicle batteries of the respective electric vehicle, all-electric vehicle, or hybrid vehicle.

Figure 9A:
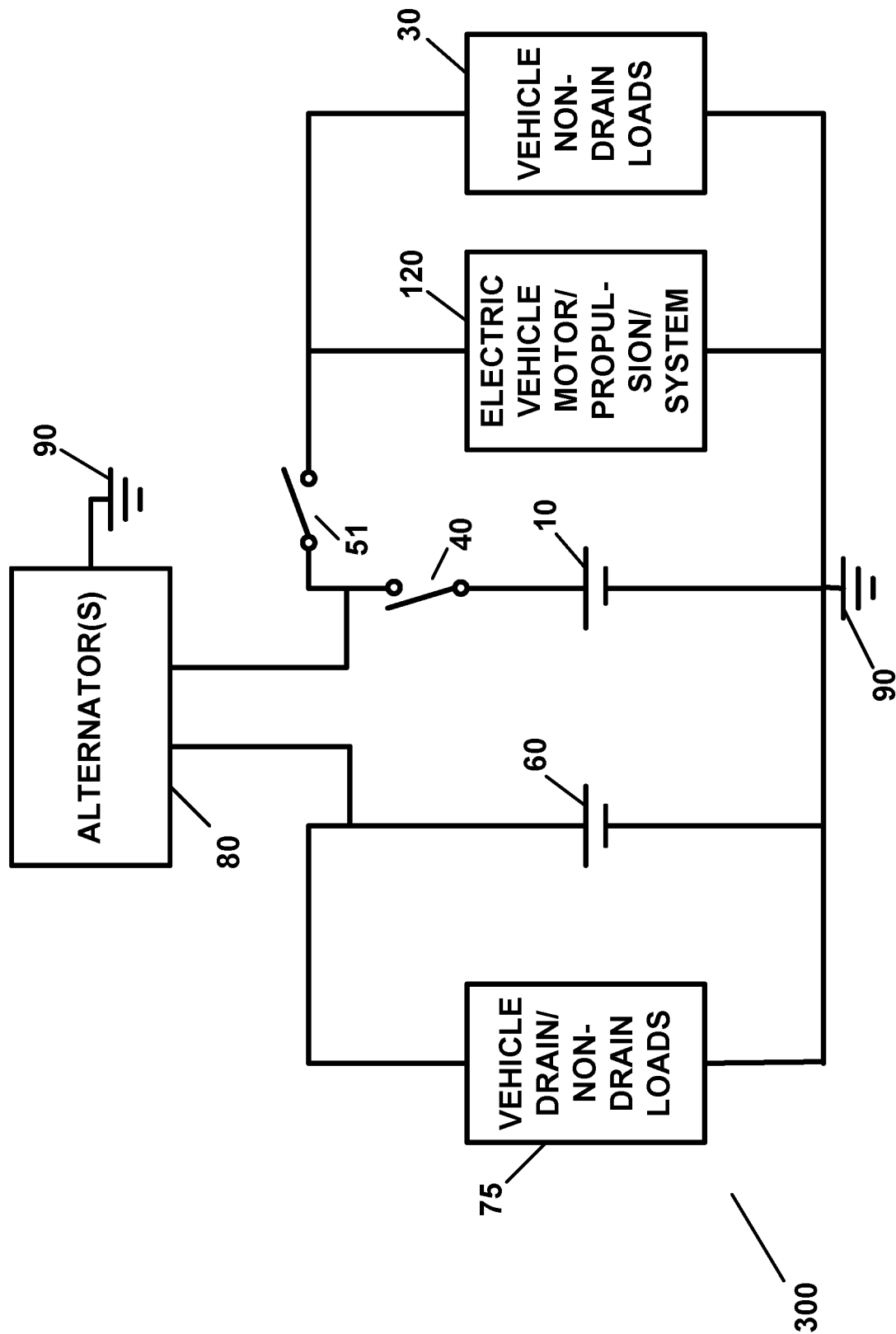
FIGS. 9A, 9B, and 9C illustrate another preferred embodiment of the apparatus of the present invention.
Figure 9B:
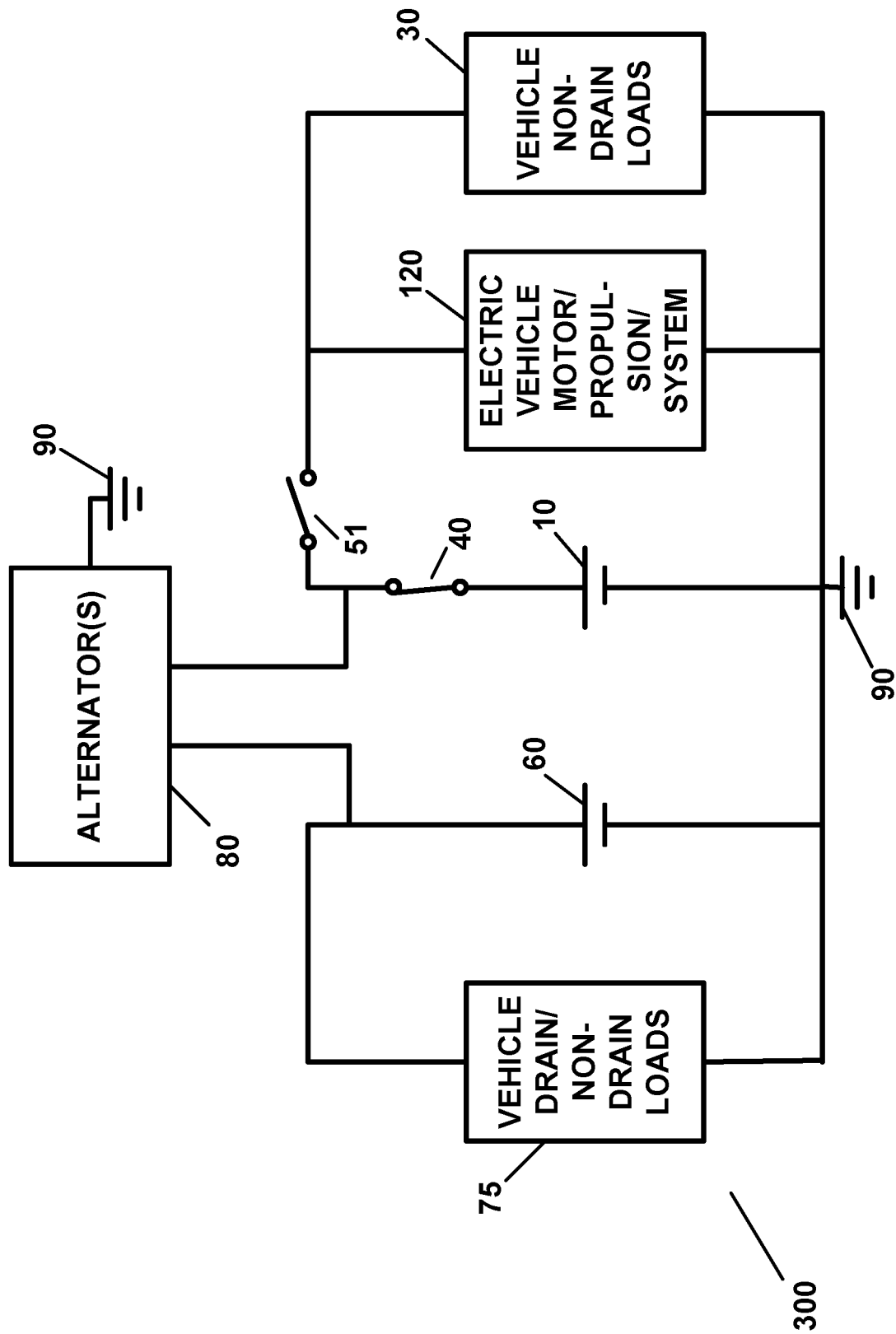
Figure 9C:
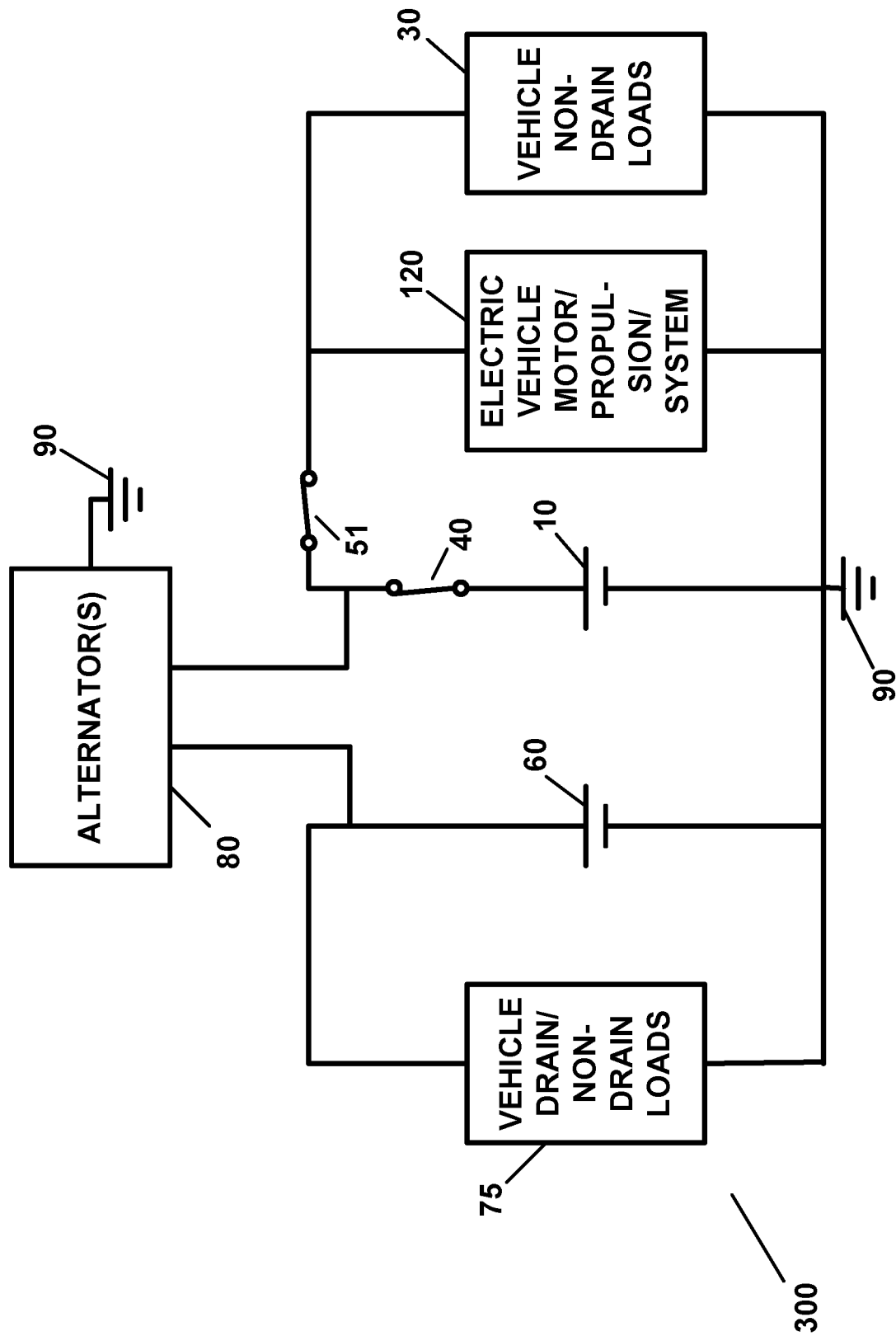

FIGS. 9A, 9B, and 9C illustrate another preferred embodiment of the present invention which can be utilized in, on, with, or in conjunction with, an electric vehicle, an all-electric vehicle, or a hybrid vehicle, so as to recharge the battery or batteries of the same and/or as well as to provide any of the herein-described battery power management functions or functionalities described herein. The apparatus of FIGS. 9A, 9B, and 9C is designated by the reference number 300. In a preferred embodiment of FIGS. 9A, 9B, and 9C, the apparatus can be utilized in, on, with, or in conjunction with, any electric vehicle, all-electric vehicle, or hybrid vehicle, of any type or kind, described herein and/or otherwise. With reference to FIGS. 9A, 9B, and 9C, the apparatus 300 includes and electric vehicle motor or propulsion system or hybrid vehicle motor or propulsion system 120 (hereinafter referred to as "electric vehicle motor/propulsion system 120").

In a preferred embodiment, the apparatus 300 of FIGS. 9A, 9B, and 9C, with the exception of the vehicle ignition system 20 of the apparatus 100 of FIG. 7, which is replaced with the electric vehicle motor/propulsion system 120, includes all of the components of the apparatus 100 of FIG. 1. In this regard, the apparatus 300 of FIGS. 9A, 9B, and 9C includes vehicle battery 10, switch 40, Power On switch 51 (which Power On switch 51 serves an electric vehicle, all-electric vehicle, or hybrid vehicle, equivalent of, or counterpart to, a vehicle ignition/On switch 50), vehicle auxiliary battery 60, vehicle non-drain loads 30, vehicle drain/non-drain loads 75, alternator(s) 80, vehicle ground 90, and electric vehicle motor/propulsion system 120, connected and/or configured as show in each of FIGS. 9A, 9B, and 9C.

In a preferred embodiment, the electric vehicle motor/propulsion system 120 can include a vehicle electric motor or any number of vehicle electric motors, which can be used to propel or power vehicle movement or propulsion, and/or can include any combination of a vehicle electric motor or vehicle electric motors, or an in-wheel motor or in-wheel motors, and/or a transmission, a differential, an axle, a spindle, a reduction gear, a reducer (defined herein, for purposes of this patent application, as a "type of transmission"), an eaxle (defined herein, for purposes of this patent application, as a "vehicle electric drive or electric propulsion system or solution which includes or contains an electric motor, power electronics, and a transmission, for powering a vehicle's axle"), and/or a wheel, of any electric vehicle, any all-electric vehicle, or any hybrid vehicle, which can be used to power, to propel, or to facilitate the propulsion or movement of the respective electric vehicle, all-electric vehicle, or hybrid vehicle.

With reference to the FIG. 9A, the apparatus 300 is shown and illustrated with each of switch 40 and Power On switch 51 in the "OPEN" or "OFF" positions, wherein the vehicle battery 10 is disconnected from, and not capable of providing electricity to, the electric vehicle motor/propulsion system 120 and to the vehicle non-drain loads 30, and wherein the Power On switch 51 prevents any electricity from being provided, from any battery or power source, to the electric vehicle motor/propulsion system 120 and to the vehicle non-drain loads 30.

With reference to FIG. 9B, the switch 40 is shown in the "CLOSED" or "ON" position, wherein the vehicle battery 10 can be connected to, and can be capable of providing electricity to, the electric vehicle motor/propulsion system 120 and to the vehicle non-drain loads 30 if and when the Power On switch 51 is switched to the "CLOSED" or "ON" position. With reference to FIG. 9C, each of switch 40 and Power On switch 51 are shown in the "CLOSED" or "ON" positions wherein the vehicle battery 10 is connected to, and provides electricity to, the electric vehicle motor/propulsion system 120 and to the vehicle non-drain loads 30.

Figure 10A:
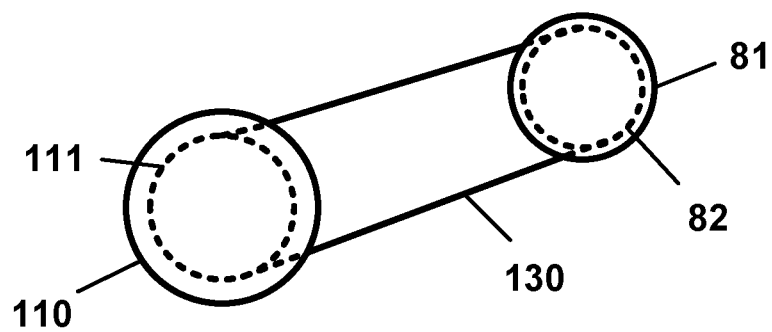
FIGS. 10A and 10B illustrate preferred embodiment mechanism for recharging the vehicle battery and the vehicle auxiliary battery of an electric vehicle, an all-electric vehicle, and/or a hybrid vehicle.
Figure 10B:
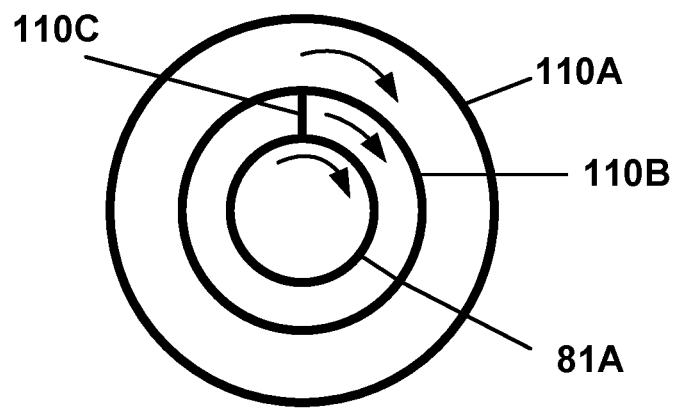

FIGS. 10A and 10B each illustrate a preferred embodiment mechanism for recharging the vehicle battery and the vehicle auxiliary battery of an electric vehicle, an all-electric vehicle, and/or a hybrid vehicle, by driving the alternator(s) 80 of the apparatus 300 with and using any suitable rotating component of a respective and suitable component of the electric vehicle motor/propulsion system 120.

FIG. 10A illustrates a preferred embodiment mechanism which includes a rotating shaft 81, which is a component of the alternator(s) 80 of FIGS. 9A, 9B, and 9C, a rotating shaft 110, which is a component of the electric vehicle motor/propulsion system 120 of FIGS. 9A, 9B, and 9C, and a fan belt 130. In a preferred embodiment, the fan belt 130 is driven by the rotating shaft 110 and, in turn, drives the rotation of the rotating shaft 81 which results in the generation of the electricity or the electrical power, by the alternator(s) 80, which electricity or electrical power is used to recharge the vehicle battery 10 and the vehicle auxiliary battery 60. In a preferred embodiment, the rotating shaft 81 provides the necessary rotation and/or rotational motion or energy which is needed by and used by the alternator(s) 80 to generate the electricity or the electrical power which is, or can be, used to recharge the vehicle battery 10 and the auxiliary vehicle battery 60 as the respective electric vehicle, all-electric vehicle, or hybrid vehicle, is operating.

With reference to FIG. 10A, the rotating shaft 81 has a recessed portion 82 (shown in dotted lines) which can facilitate a more secure seating or housing of the fan belt 130 within and/or on rotating shaft 81. As and for an example, the rotating shaft 81 can, in a preferred embodiment, be formed or molded in a cross section like a clothesline pulley so that the fan belt 130 can be situated between the sidewalls of the same in and during operation. With reference to FIG. 10A, the rotating shaft 110 also has a recessed portion 111 (shown in dotted lines) which can also facilitate a more secure seating or housing of the fan belt 130 within and/or on the rotating shaft 110. As and for an example, the rotating shaft 110 can, in a preferred embodiment, also be formed or molded in a cross section like a clothesline pulley so that the fan belt 130 can be situated between the sidewalls of the same in and during operation. In a preferred embodiment, the fan belt 130 should be secured tightly about the between the rotating shaft 81 and the rotating shaft 110 so as to prevent slippage of the fan belt 130, and so as to ensure that the rotational energy of the rotating shaft 110 is transferred to the rotating shaft 81 in an optimal and efficient manner.

In a preferred embodiment, the fan belt 130, which is utilized in the apparatus of FIGS. 99A, 9B, 9C, and 10A, can be of the type or kind which is similar to, or analogous to, conventional vehicle fan belts which are used to drive alternators or air conditioner system components in internal combustion engine vehicles. In another preferred embodiment, the fan belt 130, and/or the recessed portions 82, of the rotating shaft 81, and the recessed portions 111, of the rotating shafts 110, can be provided with corresponding grooves, serrations, or other traction inducing formations, which can prevent slippage of the fan belt 130. In another preferred embodiment, the fan belt 130 can be implemented with a chain of metal, plastic, or any other suitable material, and the the recessed portions 82, of the rotating shaft 81, and the recessed portions 111, of the rotating shafts 110, can be provided with corresponding sprocket-like protrusions (in a manner similar to a bicycle chain and sprocket system) in order to prevent slippage of the fan belt 130 on or about the rotating shaft 81 and or the rotating shaft 110.

With reference to FIG. 10A, once the fan belt 130 is adequately secured about both the rotating shaft 110 and the rotating shaft 81, the rotation of the rotating shaft 110 will drive the rotation of the rotating shaft 81.

In a preferred embodiment, any suitable and/or appropriate design technique(s) can be utilized to provide the rotating shaft 81 and the rotating shaft 110 of FIG. 10A so that the fan belt 130, which is to be driven by the rotating shaft 110, which is a rotating component of the electric vehicle motor/propulsion system 120 or any suitable component of same, can drive the rotation of the rotating shaft 81.

In a preferred embodiment, the rotating shaft 110 can be a component of any suitable component of the electric vehicle motor/propulsion system 120. In a preferred embodiment, the rotating shaft 110 can be a component of a vehicle electric motor, an in-wheel motor, a transmission, a differential, an axle, a spindle, a reduction gear, a reducer, an eaxle, or a wheel, of the respective electric vehicle, all-electric vehicle, or hybrid vehicle. In a preferred embodiment, the rotating shaft 110 can be a component of a vehicle electric motor or an in-wheel motor. In another preferred embodiment, the rotating shaft 110 can be a component of a transmission. In another preferred embodiment, the rotating shaft 110 can be a component of a differential. In another preferred embodiment, the rotating shaft 110 can be a component of an axle. In another preferred embodiment, the rotating shaft 110 can be a component of a spindle. In another preferred embodiment, the rotating shaft 110 can be a component of a reduction gear. In another preferred embodiment, the rotating shaft 110 can be a component of a reducer. In another preferred embodiment, the rotating shaft 110 can be a component of an eaxle. In another preferred embodiment, the rotating shaft 110 can be a component of a wheel. In another preferred embodiment, the rotating shaft 110 can be any rotating component of the respective electric vehicle, all-electric vehicle, or hybrid vehicle.

In another preferred embodiment, for any single electric vehicle, all-electric vehicle, or hybrid vehicle, any number of rotating shafts 81, rotating shafts 110, and fan belts 130, can be utilized or employed in, on, with, or in conjunction with, any number of multiple components of the electric vehicle motor/propulsion system 120 of the respective electric vehicle, all-electric vehicle, or hybrid vehicle, and/or any number of rotating shafts 81, rotating shafts 110, and fan belts 130, can be utilized or employed at multiple locations of, in, on, with, or in conjunction with, any one or single rotating component of the electric vehicle motor/propulsion system 120 of the respective electric vehicle, all-electric vehicle, or hybrid vehicle.

With reference once again to FIG. 10A, the mechanism disclosed therein can be used to generate electricity or electrical power in the following manner. When the electric vehicle motor/propulsion system is operating and/or when the vehicle is in motion, the rotation of the rotating shaft 110 (of the respective component of the electric vehicle motor/propulsion system 120) will, via the fan belt 130, drive the rotation of the rotating shaft 81. The rotation of the rotating shaft 81 will drive the alternator(s) 80 and the alternator(s) 80 will generate electricity which is used to recharge the vehicle battery 10 and the vehicle auxiliary battery 60.

FIG. 10B illustrates a cross section of another preferred embodiment mechanism for driving a rotating shaft of the alternator(s) 80 so as to generate electricity which is used to recharge the vehicle battery 10 and the vehicle auxiliary battery 60. With reference to FIG. 10B, the rotating shaft 81A, which is a component of the alternator(s) 80, is shown situated coaxially within the rotating shaft 110A of the respective component of the electric vehicle motor/propulsion system 120. With reference to FIG. 10B, the rotating shaft 110A has an inner surface 110B as shown. In a preferred embodiment, the rotating shaft 81A is fastened to the inner surface 110B of the rotating shaft 110A via connecting member 110C as shown. In the mechanism of FIG. 10B, as the rotating shaft 110A rotates, the connecting member 110C causes the rotating shaft 81A to rotate in the same direction as the rotation of the rotating shaft 110A. Although shown as rotating clockwise, it is important to note that rotating shaft 110A can also rotate counterclockwise, and when such is the case, the rotating shaft 81A would also rotate counterclockwise along with the rotating shaft 110C.

With reference once again to FIG. 10B, the mechanism disclosed therein can be used to generate electricity or electrical power in the following manner. When the electric vehicle motor/propulsion system is operating and/or when the vehicle is in motion, the rotation of the rotating shaft 110A (of the respective component of the electric vehicle motor/propulsion system 120) will, via the connecting member 110C, drive the rotation of the rotating shaft 81A. The rotation of the rotating shaft 81A will drive the alternator(s) 80 and the alternator(s) 80 will generate electricity which is used to recharge the vehicle battery 10 and the vehicle auxiliary battery 60.

In another preferred embodiment, the apparatus 300 and/or the recharging mechanisms of FIGS. 10A and/or 10B can also be utilized along with remote control circuitry and/or remote control components which can be utilized in order to remotely open or to remotely close each of the main cutoff switch 40 and the Power On switch 51, and/or to monitor or to control the battery power management functions or functionalities of the apparatus and methods of the present invention.

Figure 11:
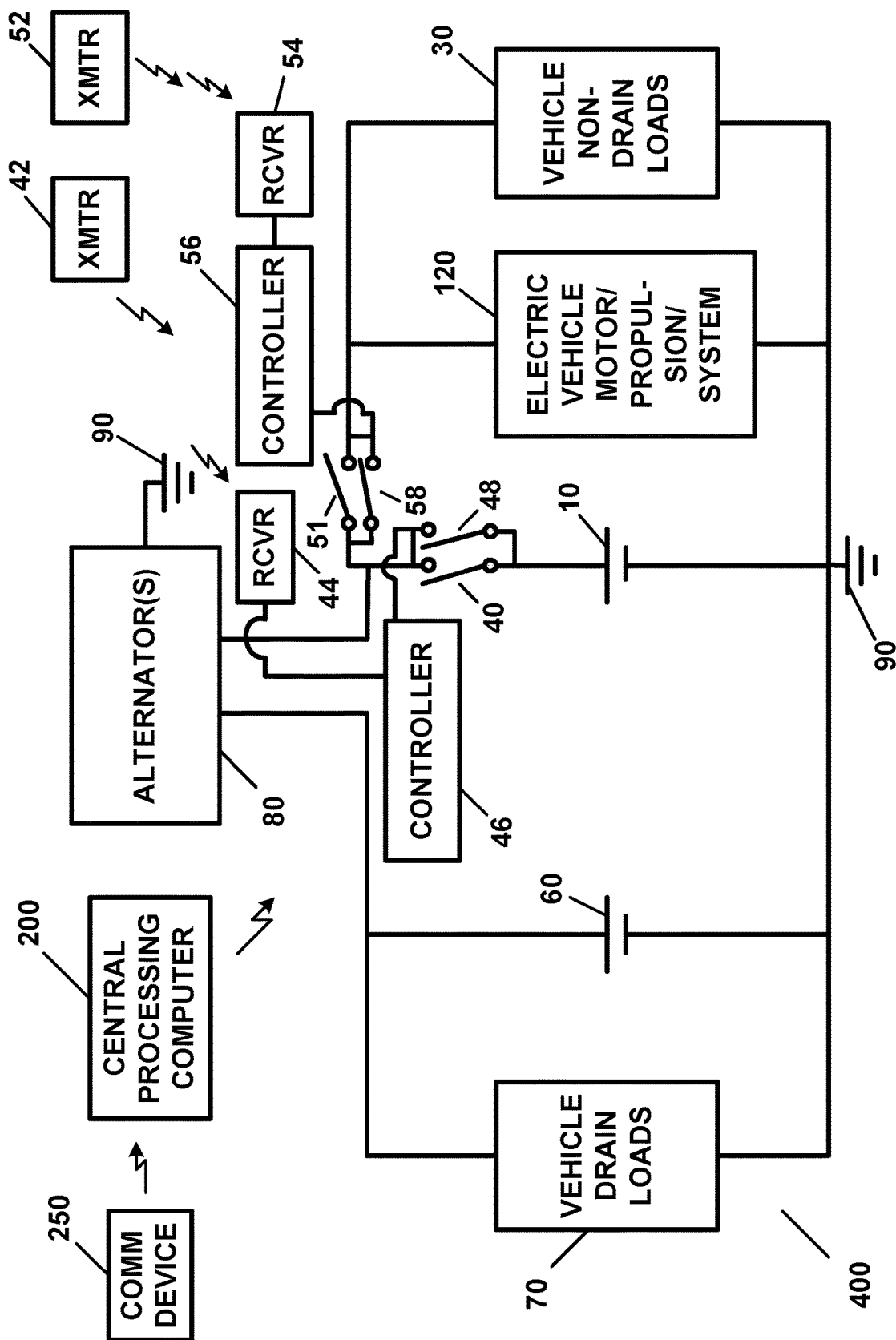
FIG. 11 illustrates another preferred embodiment of the apparatus of the present invention.

FIG. 11 illustrates another preferred embodiment of the apparatus of the present invention which is designated by the reference number 400. With reference to FIG. 11, the apparatus 400 includes, in place of a vehicle ignition system 20, an electric vehicle motor/propulsion system 120. With reference to FIG. 11, the apparatus 400 can include a transmitter 42, which can be any type or kind of remote control transmitter for opening or closing the circuit controlled by the main cutoff switch 40 and which, in a preferred embodiment, can be integrated into and/or with a vehicle remote control device, a key chain, or a key fob, or any other device, a receiver 44 located at, in, or on, the vehicle, for receiving a signal, signals, or sequence of signals, transmitted from the transmitter 42 and indicative of a main shutoff switch opening operation or a main cutoff switch closing operation, a controller 46 for processing any signal, signals, or sequence of signals, received by the receiver 44, and an electronically activated switching device 48 which can located in parallel with the main cutoff switch 40, which can serve to close or open the circuit controlled by the main cutoff switch 40. In a preferred embodiment, the electronically activated switching device 48 can be placed in parallel with the main cutoff switch 40 so that it can simply bypass the main cutoff switch 40 in a preferred embodiment.

With reference once again to FIG. 11, the apparatus 400 can include a transmitter 52, which can be any type or kind of remote control transmitter for opening or closing the circuit controlled by the Power On switch 51 and which, in a preferred embodiment, can also be integrated into and/or with a vehicle remote control device, a key chain, or a key fob, or any other device, a receiver 54 located at, in, or on, the vehicle, for receiving a signal, signals, or sequence of signals, transmitted from the transmitter 52 and indicative or a vehicle Power On switch 51 opening operation or a Power On switch 51 closing operation, a controller 56 for processing any signal, signals, or sequence of signals, received by the receiver 54, and an electronically activated switching device 58 which can located in parallel with the Power On switch 51, which can serve to close or open the circuit controlled by the Power On switch 51. In a preferred embodiment, the electronically activated switching device 58 can be placed in parallel with the Power On switch 51 so that it can simply bypass the Power On switch 51 in a preferred embodiment.

In a preferred embodiment, the transmitter 42 and/or the transmitter 52 can also be implemented by, replaced by, or used in conjunction with, a central processing computer or an Internet server 200 (hereinafter "central processing computer 200"), which can be associated with a web site. In another preferred embodiment, any authorized user or authorized person can utilize any suitable communication device 250, which, in a preferred embodiment, can be a personal computer, a tablet, a tablet computer, a laptop computer, a notebook computer, a cellular telephone, a wireless telephone, a personal digital assistant, or any other suitable device, in order transmit any respective signal, signals, or sequence of signals, to the respective receiver 44 and/or to the respective receiver 54 via the central processing computer 200 on, over, or via, the Internet and/or the World Wide Web, and/or on or over any other communication network(s), wireless communication network(s), or any combination of same. In this regard, in a preferred embodiment, any authorized user or authorized person can use or control the apparatus 100 of the present invention on, over, or via, the Internet and/or the World Wide Web and/or any other communication network(s), wireless communication network(s), or any combination of same.

Figure 12:
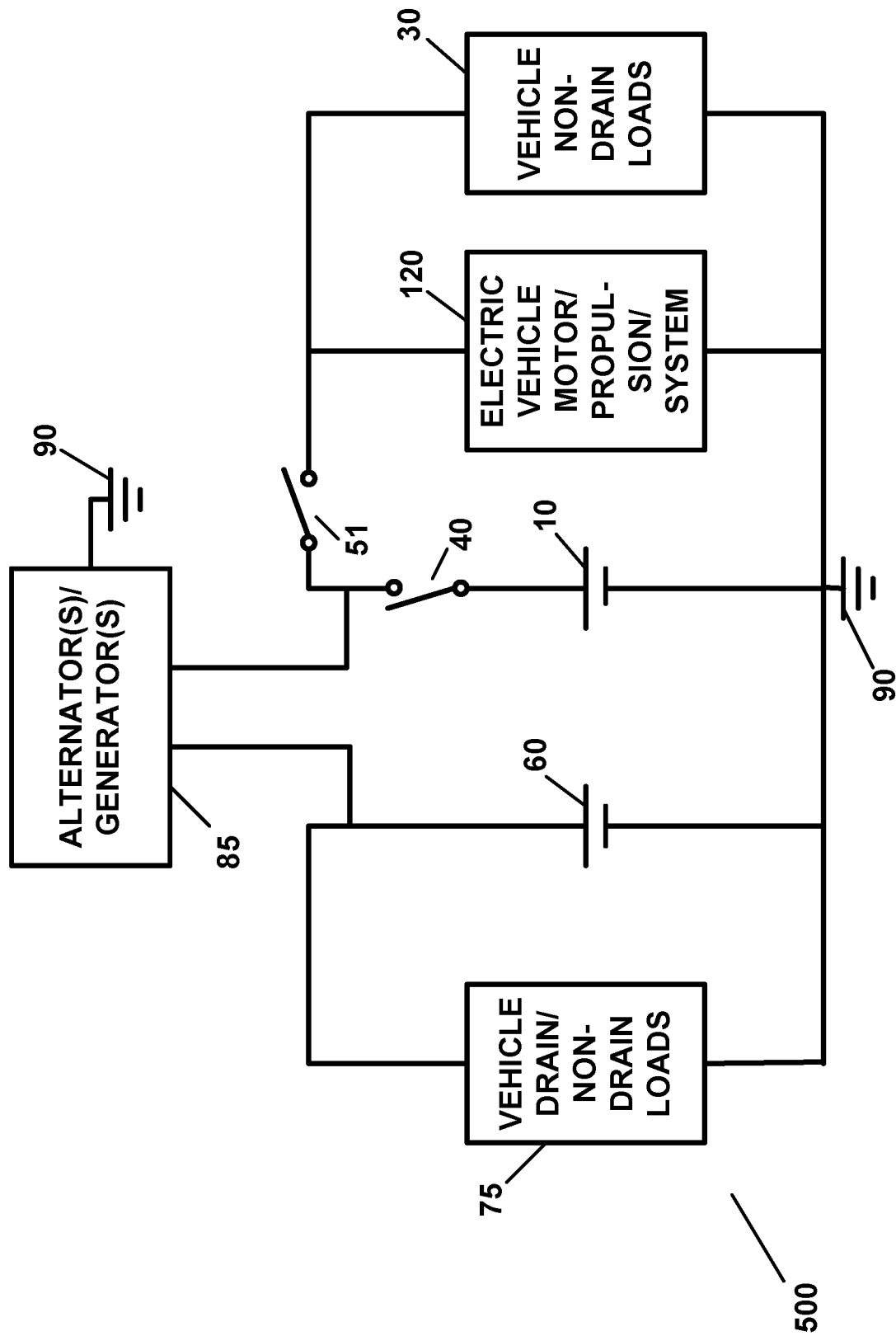
FIG. 12 illustrates still another preferred embodiment of the apparatus of the present invention.

In another preferred embodiment, the apparatus 300 of FIGS. 9A, 9B, and 9C can also be utilized along with any number of alternators and/or generators in order to recharge the vehicle battery 10 and the vehicle auxiliary battery 60. FIG. 12 illustrates another preferred embodiment of the apparatus of the present invention which is designated by the reference numeral 500. With reference to FIG. 12, the apparatus 500 includes, in place of alternator(s) 80, alternator(s)/generators 85.

Figure 13:
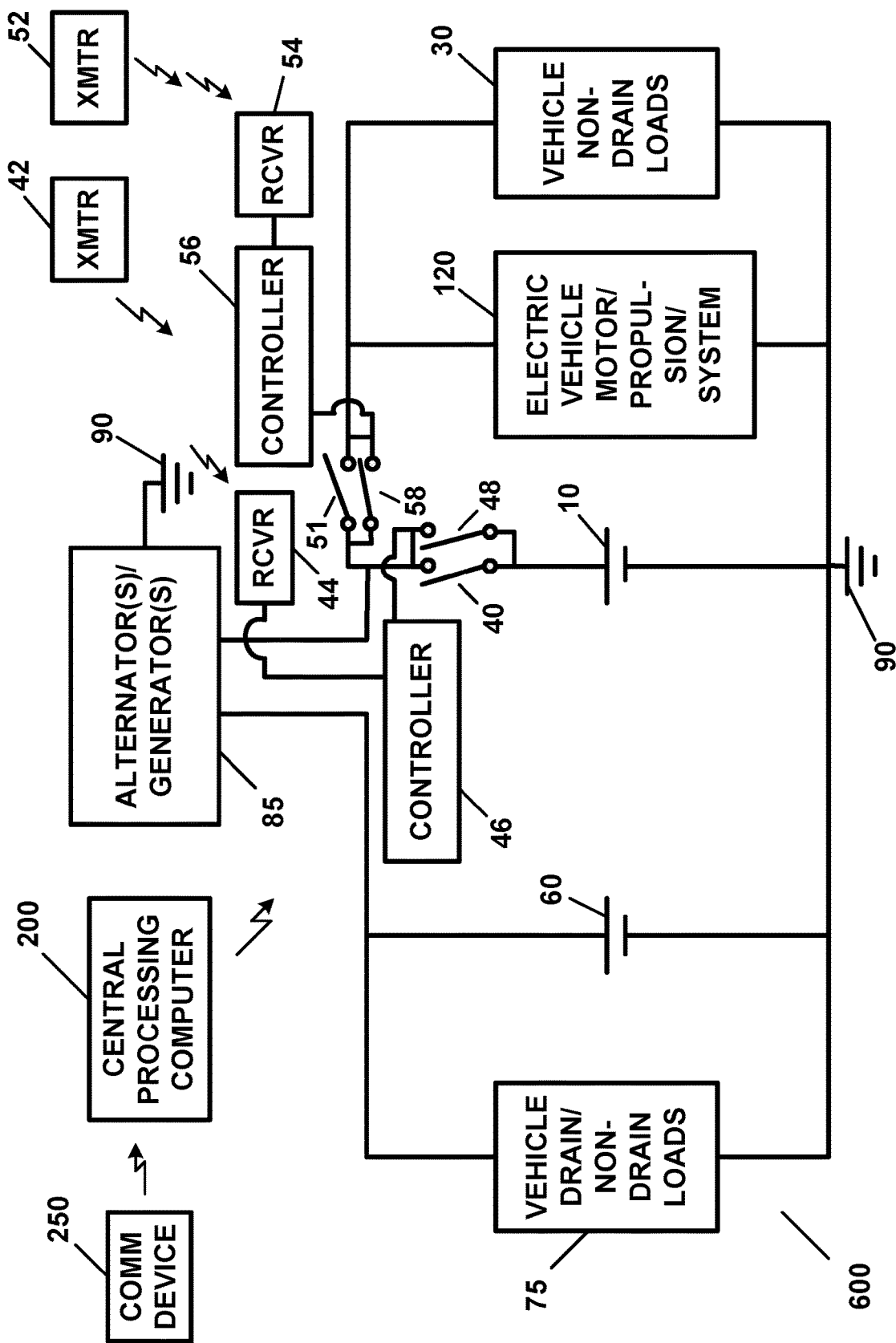
FIG. 13 illustrates yet another preferred embodiment of the apparatus of the present invention.

In another preferred embodiment, the apparatus 400 of FIG. 11 can also be utilized along with any number of alternators and/or generators in order to recharge the vehicle battery 10 and the vehicle auxiliary battery 60. FIG. 13 illustrates another preferred embodiment of the apparatus of the present invention which is designated by the reference numeral 600. With reference to FIG. 13, the apparatus 600 includes, in place of alternator(s) 80, alternator(s)/generators 85.

In another preferred embodiment, as well as in any and/or all of the embodiments described herein, the apparatus and methods of the present invention can also be utilized in, on, and/or in connection with, and/or in conjunction with, vehicles of any kinds, types, or sizes, including, but not limited to, vehicles which require, or which may require, a driver, an operator, or a pilot, self-driving vehicles, autonomous vehicles, and/or remote-controlled vehicles, any of which vehicles can also be land vehicles, air vehicles, and/or sea vehicles or marine vehicles, of any kind, type, or size, and including, but not limited to, automobiles, cars, trucks, buses, trains, subway trains, aircraft, airplanes, jets, helicopters, drones, spacecraft, and/or satellites, and/or water vehicles or marine vehicles, boats, ships, submarines, and/or submersible vehicles, or any kind, type, or size.

In this regard, in a preferred embodiment, the apparatus and methods of the present invention can be utilized in, on, and/or in connection with, and/or in conjunction with, vehicles of any kinds, types, or sizes, including, but not limited to, vehicles which require, or which may require, a driver, an operator, or a pilot, self-driving vehicles, autonomous vehicles, and/or remote-controlled vehicles. Further, the apparatus and methods of the present invention can also be utilized in, on, and/or in connection with, and/or in conjunction with, land vehicles, air vehicles, and/or sea vehicles or marine vehicles, of any kind, type, or size. Still further, the apparatus and methods of the present invention can also be utilized in, on, and/or in connection with, and/or in conjunction with, automobiles, cars, trucks, buses, trains, subway trains, aircraft, airplanes, jets, helicopters, drones, spacecraft, and/or satellites, and/or water vehicles or marine vehicles, boats, ships, submarines, and/or submersible vehicles, or any kind, type, or size.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:
a first circuit, wherein the first circuit contains a first load, wherein the first load does not draw current from a first battery when the first load is not operating, and further wherein the first load comprises an electric motor of an electric vehicle or a hybrid vehicle;
a second circuit, wherein the second circuit contains a second load, wherein the second load draws current from a second battery when the first load is not operating or is non-operational;
a first switch, wherein the first switch is capable of disconnecting the first battery from the first circuit;
a second switch, wherein the second switch is capable of connecting the first battery to the first circuit, wherein the first switch and the second switch are connected in series; and
at least one recharger, wherein the at least one recharger is capable of recharging the first battery and the second battery when the first load is operating, wherein the apparatus is capable of providing electrical power to the second load when the at least one recharger ceases to operate or becomes non-operational.

2. The apparatus of claim 1, further comprising:
a receiver, wherein the receiver receives a signal transmitted from a remote control device or a wireless device, wherein the apparatus opens the first switch in response to the signal, or wherein the apparatus closes the first switch in response to the signal.

3. The apparatus of claim 1, further comprising:
a receiver, wherein the receiver receives a signal transmitted from a central processing computer, wherein the signal is transmitted over the Internet or the World Wide Web to the receiver, and further wherein the apparatus opens the first switch in response to the signal, or wherein the apparatus closes the first switch in response to the signal.

4. The apparatus of claim 1, further comprising:
a third load, wherein the third load is connected between the first circuit and a third circuit, wherein the third circuit contains the second battery, and further wherein the third load generates a circuit stabilizing voltage drop when respective voltage levels of the first battery and the second battery are not equal.

5. The apparatus of claim 1, wherein the first switch is a cut-off switch.

6. The apparatus of claim 1, wherein the second switch is a switch associated with the electric motor of the electric vehicle or the hybrid vehicle.

7. The apparatus of claim 1, wherein the first load further comprises:
a differential.

8. The apparatus of claim 1, wherein the electric motor is an in-wheel motor.

9. The apparatus of claim 1, wherein the first load further comprises:
an electric power control unit.

10. The apparatus of claim 1, further comprising:
a first rotating shaft, wherein the first rotating shaft is a component of the electric motor, a transmission, a reduction gear, a reducer, an eaxle, an axle, or a wheel; and
a second rotating shaft, wherein the second rotating shaft is a component of the at least one recharger,
wherein the first rotating shaft drives a rotation of the second rotating shaft.

11. The apparatus of claim 10, further comprising:
a fan belt, wherein the fan belt is attached to the first rotating shaft and the second rotating shaft, and further wherein the fan belt causes the second rotating shaft to rotate in response to a rotation of the first rotating shaft.

12. The apparatus of claim 10, further comprising:
a connecting member, wherein the connecting member is connected to each of the first rotating member and the second rotating member, and further wherein the connecting member caused the second rotating member to rotate in response to a rotation of the first rotating shaft.

13. The apparatus of claim 10, wherein the second rotating shaft is coaxial with the first rotating shaft.

14. The apparatus of claim 10, further comprising:
a chain, wherein the chain interacts with a sprocket on the first rotating shaft and a sprocket on the second rotating shaft, and further wherein the chain causes the second rotating shaft to rotate in response to a rotation of the first rotating shaft.

15. The apparatus of claim 1, wherein the at least one recharger is an alternator or a plurality of alternators, or wherein the at least one recharger is a generator or a plurality of generators.

16. The apparatus of claim 1, wherein the first load comprises a plurality of electric motors of the electric vehicle or the hybrid vehicle.

17. The apparatus of claim 1, wherein the electric vehicle or the hybrid vehicle is a land vehicle, an air vehicle, a sea vehicle, a marine vehicle, and further wherein the electric vehicle or the hybrid vehicle, is a self-driving vehicle, an autonomous vehicle, or a remote-controlled vehicle.

18. The apparatus of claim 1, wherein the first load further comprises:
power electronics; and
a transmission, wherein the transmission is a reducer.

19. The apparatus of claim 1, further comprising:
the first battery; and
the second battery.

20. The apparatus of claim 1, wherein the first load is an eaxle.

21. An apparatus, comprising:
a first circuit, wherein the first circuit contains a first load, wherein the first load does not draw current from a first battery when the first load is not operating, and further wherein the first load comprises an electric motor of an electric vehicle or a hybrid vehicle;
a second circuit, wherein the second circuit contains a second load, wherein the second load draws current from a second battery when the first load is not operating or is non-operational;
a first switch, wherein the first switch disconnects the first battery from the first circuit;
a second switch, wherein the second switch connects the first battery to the first circuit, wherein the first switch and the second switch are connected in series; and
at least one recharger, wherein the at least one recharger recharges the first battery and the second battery when the first load is operating, wherein the apparatus provides electrical power to the second load when the at least one recharger ceases to operate or becomes non-operational, and further wherein the first load further comprises:
power electronics; and
a transmission.

* * * * *